US011644613B2

(12) United States Patent
Yamamoto et al.

(10) Patent No.: US 11,644,613 B2
(45) Date of Patent: May 9, 2023

(54) LIGHT SOURCE DEVICE AND DISPLAY DEVICE HAVING THE LIGHT SOURCE DEVICE

(71) Applicant: Japan Display Inc., Tokyo (JP)

(72) Inventors: Rina Yamamoto, Tokyo (JP); Ken Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/487,102

(22) Filed: Sep. 28, 2021

(65) Prior Publication Data

US 2022/0011498 A1 Jan. 13, 2022

Related U.S. Application Data

(63) Continuation of application No. PCT/JP2020/015057, filed on Apr. 1, 2020.

(30) Foreign Application Priority Data

Apr. 12, 2019 (JP) .............................. JP2019-076285

(51) Int. Cl.
*F21V 8/00* (2006.01)
*F21V 11/08* (2006.01)
(Continued)

(52) U.S. Cl.
CPC .............. *G02B 6/0086* (2013.01); *F21V 3/00* (2013.01); *F21V 11/08* (2013.01); *F21V 17/101* (2013.01);
(Continued)

(58) Field of Classification Search
CPC .. G02B 6/0086; G02B 6/0053; G02B 6/0055; F21V 3/00; F21V 11/08; F21V 17/101;
(Continued)

(56) References Cited

U.S. PATENT DOCUMENTS 6,002,582 A * 12/1999 Yeager .............. G02F 1/133308
345/905
7,944,522 B2 * 5/2011 Yun ................... G02F 1/133308
349/58
(Continued)

FOREIGN PATENT DOCUMENTS

CN 101526687 A 9/2009
JP 2007-010707 A 1/2007
(Continued)

OTHER PUBLICATIONS

International Search Report issued in International Patent Application No. PCT/JP2020/015057 dated Jun. 9, 2020 and English translation of same. 5 pages.
(Continued)

*Primary Examiner* — Tsion Tumebo
(74) *Attorney, Agent, or Firm* — K&L Gates LLP

(57) ABSTRACT

The light source device includes a rear vessel, a light source substrate, a plurality of light-emitting diodes, a front cover, and a light diffuser. The rear vessel has a bottom plate and a first lower side plate connected to the bottom plate. The light source substrate is accommodated in the rear vessel. The plurality of light-emitting diodes is located over the light source substrate. The front cover has an upper plate and a first upper side plate connected to the upper plate, is located over the rear vessel, and accommodates the rear vessel. The light diffuser is accommodated in the front cover, is located over the plurality of light-emitting diodes, and is spaced away from the plurality of light-emitting diodes. The first lower side plate and the first upper side plate each have a notch.

11 Claims, 14 Drawing Sheets

(51) Int. Cl.
*F21V 17/10* (2006.01)
*F21Y 115/10* (2016.01)
*F21V 3/00* (2015.01)

(52) U.S. Cl.
CPC ......... *G02B 6/0053* (2013.01); *G02B 6/0055* (2013.01); *F21Y 2115/10* (2016.08)

(58) Field of Classification Search
CPC ............. F21Y 2115/10; G02F 2201/46; G02F 1/13332; G02F 1/133314
See application file for complete search history.

(56) References Cited

U.S. PATENT DOCUMENTS

| | | | | |
|---|---|---|---|---|
| 8,233,015 | B2* | 7/2012 | Lee | G02F 1/133308 345/905 |
| 8,472,166 | B2* | 6/2013 | Kubo | G06F 1/1601 361/600 |
| 8,861,190 | B2* | 10/2014 | Kim | H05K 5/02 361/679.01 |
| 9,256,102 | B1* | 2/2016 | Hsiao | G02B 6/0088 |
| 10,416,375 | B1* | 9/2019 | Lin | G02B 6/0061 |
| 10,571,728 | B2* | 2/2020 | Wang | G02F 1/133308 |
| 2005/0122739 | A1* | 6/2005 | Huang | F21V 19/008 362/608 |
| 2006/0291065 | A1* | 12/2006 | Hasei | B29D 11/00298 359/619 |
| 2009/0135331 | A1* | 5/2009 | Kawase | G02F 1/133605 362/97.2 |
| 2009/0225256 | A1 | 9/2009 | Kim | |
| 2011/0122334 | A1* | 5/2011 | Tang | G02F 1/13452 349/58 |
| 2012/0105737 | A1* | 5/2012 | Kuromizu | H05K 1/142 348/739 |
| 2013/0016524 | A1* | 1/2013 | Momose | G02F 1/133308 362/613 |
| 2013/0308074 | A1* | 11/2013 | Park | G02F 1/133308 362/634 |
| 2014/0184985 | A1* | 7/2014 | Liu | G02F 1/133308 349/61 |
| 2014/0368768 | A1* | 12/2014 | Sakai | G02F 1/133606 349/64 |
| 2018/0046031 | A1* | 2/2018 | Kamada | F21S 2/00 |
| 2018/0292597 | A1* | 10/2018 | Xia | G02B 6/0051 |

FOREIGN PATENT DOCUMENTS

| | | |
|---|---|---|
| JP | 2012-104731 A | 5/2012 |
| JP | 2013-037331 A | 2/2013 |
| JP | 2013-143240 A | 7/2013 |
| JP | 2014-235991 A | 12/2014 |
| JP | 2017-173785 A | 9/2017 |
| JP | 2018-128660 A | 8/2018 |

OTHER PUBLICATIONS

Written Opinion issued in International Patent Application No. PCT/JP2020/015057 dated Jun. 9, 2020. 4 pages.
English Translation of Office Action issued in related Japanese Patent Application No. 2019-076285 dated Nov. 22, 2022. 4 pages.

* cited by examiner

LIGHT SOURCE DEVICE AND DISPLAY DEVICE HAVING THE LIGHT SOURCE DEVICE

CROSS REFERENCE TO RELATED APPLICATIONS

This application is a Continuation of International Patent Application No. PCT/JP2020/015057, filed on Apr. 1, 2020, which claims priority to Japanese Patent Application No. 2019-076285, filed on Apr. 12, 2019, the disclosures of which are incorporated herein by reference for all purposes as if fully set forth herein.

BACKGROUND OF THE INVENTION

An embodiment of the present invention relates to a light source device for a liquid crystal display module and a display device including the light source device.

DESCRIPTION OF THE RELATED ART

Currently, a liquid crystal display device is represented as one of the most widely used display devices. A liquid crystal display device has a light source device (backlight) and a liquid crystal display module arranged over the light source device as fundamental elements. A cold cathode tube and a light-emitting diode (LED) including an inorganic compound as an emitter are used as a light source of the light source device. For example, Japanese Patent Application Publications No. 2013-143240, 2017-173785, and 2012- disclose a liquid crystal display device including a light source device arranged so that a plurality of light emitting diodes overlaps a liquid crystal display module.

BRIEF SUMMARY OF THE INVENTION

An embodiment of the present invention is a light source device. The light source device includes a rear vessel, a light source substrate, a plurality of light-emitting diodes, a front cover, and a light diffuser. The rear vessel has a bottom plate and a first lower side plate connected to the bottom plate. The light source substrate is accommodated in the rear vessel. The plurality of light-emitting diodes is located over the light source substrate. The front cover has an upper plate and a first upper side plate connected to the upper plate, is located over the rear vessel, and accommodates the rear vessel. The light diffuser is accommodated in the front cover, is located over the plurality of light-emitting diodes, and is spaced away from the plurality of light-emitting diodes. The first lower side plate and the first upper side plate each have a notch.

An embodiment of the present invention is a light source device. The light source device includes a rear vessel, a light source substrate, a plurality of light-emitting diodes, and a light diffuser. The rear vessel has a first side plate, a second side plate opposing the first side plate, and a bottom plate connected to the first side plate and the second side plate. The light source substrate is accommodated in the rear vessel. The plurality of light-emitting diodes is located over the light source substrate. The light diffuser is accommodated in the rear vessel, is located over the plurality of light-emitting diodes, overlaps the plurality of light-emitting diodes, and is spaced away from the plurality of light-emitting diodes. The first side plate and the second side plate each have an underside guide and an upside guide extending in a direction parallel to the bottom plate. Edge portions of the light diffuser opposing each other are located in trenches formed by the upside guides and the underside guides.

An embodiment of the present invention is a display device. The display device includes a light source device and a liquid crystal display module over the light source device. The light source device includes a rear vessel, light source substrate, a plurality of light-emitting diodes, a front cover, a light diffuser, and an adhesive tape. The rear vessel has a bottom plate and a first lower side plate connected to the bottom plate. The light source substrate is accommodated in the rear vessel. The plurality of light-emitting diodes is located over the light source substrate. The front cover has an upper plate and a first upper side plate connected to the upper plate, is located over the rear vessel, and accommodates the rear vessel. The light diffuser is accommodated in the front cover, is located over the plurality of light-emitting diodes, and is spaced away from the plurality of light-emitting diodes. The adhesive tape fixes the light diffuser to the front cover. The first lower side plate and the first upper side plate each have a notch. The adhesive tape is sandwiched by the rear vessel and the front cover and passes through the notch of the first upper side plate and the notch of the first lower side plate.

An embodiment of the present invention is a display device. The display device includes a light source device and a liquid crystal display module over the light source device. The light source device includes a rear vessel, a light source substrate, a plurality of light-emitting diodes, and a light diffuser. The rear vessel has a first side plate, a second side plate opposing the first side plate, and a bottom plate connected to the first side plate and the second side plate. The light source substrate is accommodated in the rear vessel. The plurality of light-emitting diodes is located over the light source substrate. The light diffuser is accommodated in the rear vessel, is located over the plurality of light-emitting diodes, overlaps the plurality of light-emitting diodes, and is spaced away from the plurality of light-emitting diodes. The first side plate and the second side plate each have an underside guide and an upside guide extending in a direction parallel to the bottom plate. Edge portions of the light diffuser opposing each other are located in trenches formed by the upside guides and the underside guides.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, integration of a plurality of elements means that the plurality of elements is formed of one member although they are different in thickness, shape, direction, or the like from one another. Thus, the plurality of integrated elements includes the same material and has the same composition as each other.

First Embodiment

In the present embodiment, a light source device 110 and a display device 100 including the light source device 110 according to an embodiment of the present invention are explained.

1. Outline Structure

Figure 1:
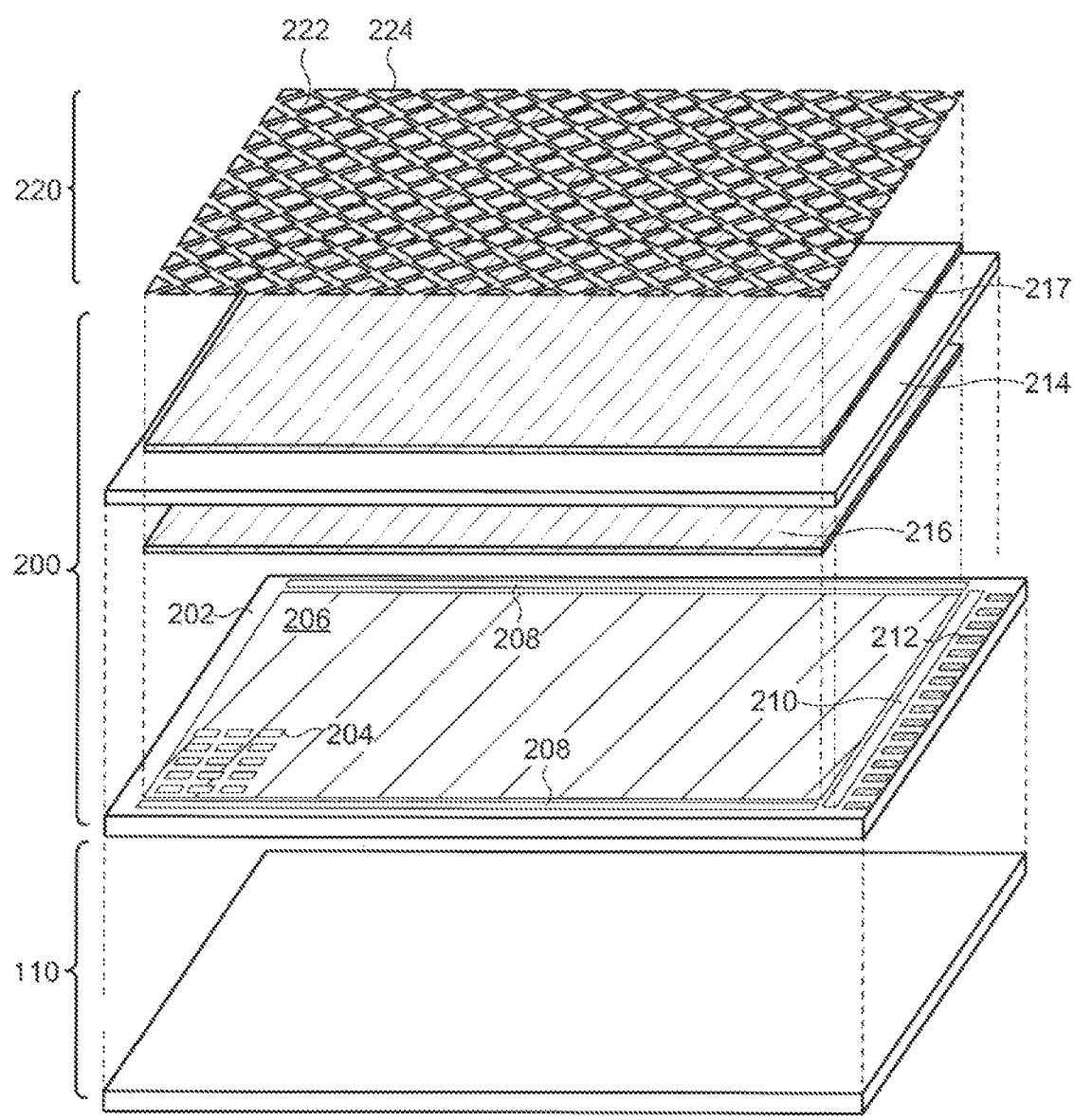
FIG. 1 is a schematic developed view of a display device according to an embodiment of the present invention.

An outline structure of the display device 100 is explained using a schematic developed view of FIG. 1. The display device 100 includes a light source device 110 and a liquid crystal display module 200 disposed to overlap the light source device 110 as fundamental components. As an optional component, the display device 100 may have a touch sensor 220 over the liquid crystal display module 200.

The liquid crystal display module 200 includes an array substrate 202, a counter substrate 214 over the array substrate 202, a pair of polarizing plates 216 and 217 sandwiching the array substrate 202 and the counter substrate 214, and a liquid crystal layer (not illustrated) sandwiched between the array substrate 202 and the counter substrate 214. A variety of patterned conductive films, insulating films, and semiconductor films is stacked over the array substrate 202, and an appropriate arrangement of these films allows the formation of the plurality of pixels 204, driver circuits (scanning line driver circuits 208 and a signal line driver circuit 210) for driving the pixels 204, a plurality of terminals 212, and the like. A display region 206 is formed by the plurality of pixels 204. A region other than the display region 206 is called a frame region.

The pair of polarizing plates 216 and 217 is arranged to overlap the display region 206. A variety of signals including an image signal as well as a power source are supplied from an external circuit (not illustrated) to the liquid crystal display module 200 through the terminals 212, and the driver circuits are operated by these signals and the power source. The driver circuits control the pixels 204, by which an orientation of liquid crystal molecules included in the liquid crystal layer over the pixels 204 is controlled, allowing the gradation of the light from the light source device 110 to be controlled in every pixel 204.

The touch sensor 220 which is an optional component is arranged to overlap the display region 206. There is no limitation to the structure of the touch sensor 220, and an electrostatic capacitive type of touch sensor may be used as the touch sensor 220 as shown in FIG. 1, for example. In this case, the touch sensor 220 is structured by a plurality of first touch electrodes 222 extending in one direction (e.g., a long side direction of the display region 206), a plurality of second touch electrodes 224 intersecting the first touch electrodes 222, and an insulating film (not illustrated) electrically insulating these electrodes. A capacitance is generated by the first touch electrodes 222, the second touch electrodes 224, and the insulating film, which varies when a user touches the touch sensor 220 with a finger or the like. It is possible to judge whether there is a touch or not and specify a position (coordinates) thereof by detecting the capacitance variation. With this mechanism, the user is able to input a variety of instructions to the display device 100. Note that, although the light source device 110, the liquid crystal display module 200, and the touch sensor 220 are illustrated so as to be spaced away from one another, these components are fixed to one another using an adhesive layer, a housing, or the like.

2. Light Source Device

Figure 2:
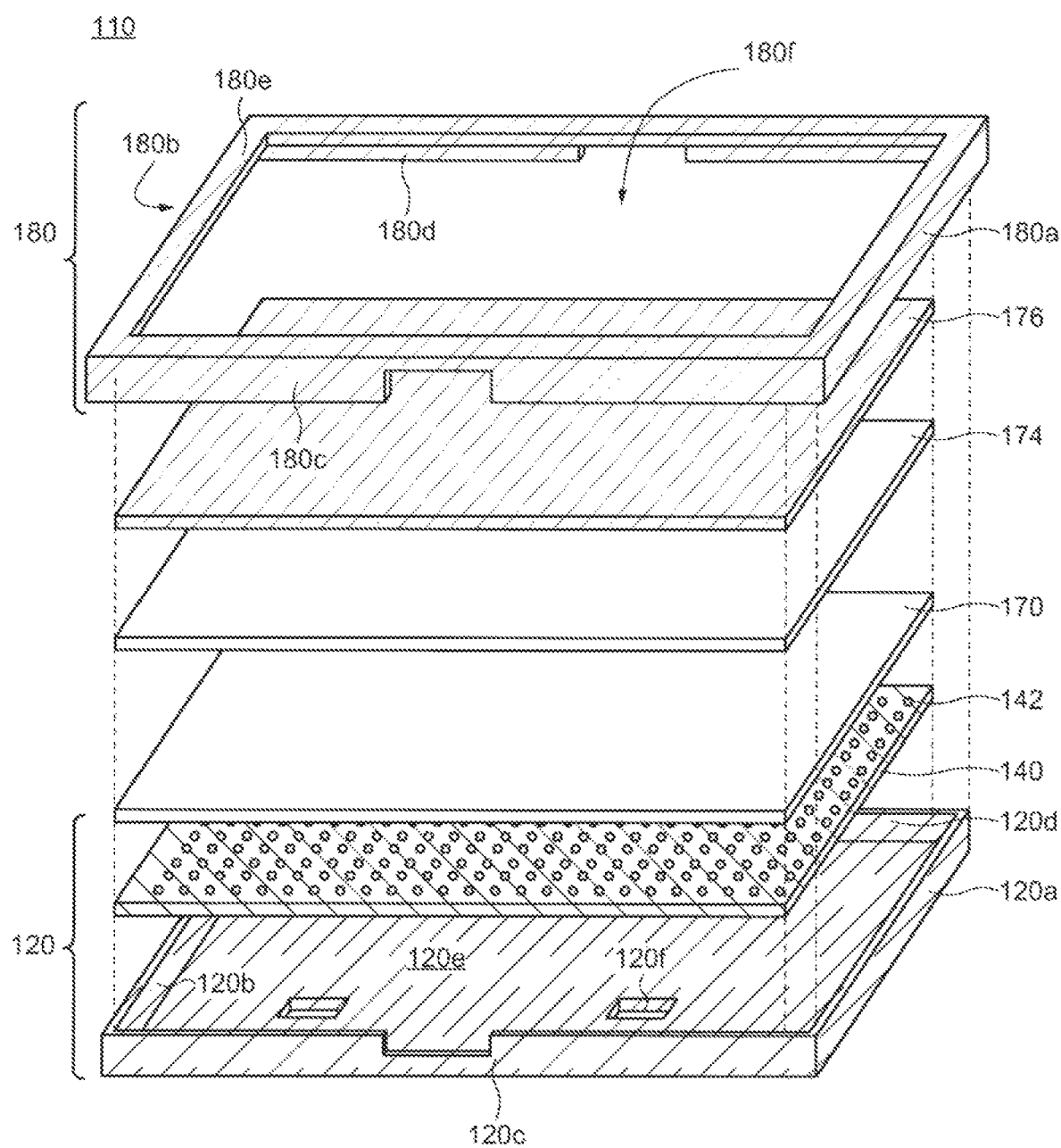
FIG. 2 is a schematic developed view of a light source device according to an embodiment of the present invention.

A schematic developed view of the light source device 110 is shown in FIG. 2. The light source device 110 includes a rear vessel 120 and a front cover 180 accommodating the whole of or a part of the rear vessel 120, and a light source substrate 140, a light diffuser 170 over the light source substrate 140, a prism sheet 174 over the light diffuser 170, and a reflective polarizing plate 176 over the prism sheet 174 are arranged between the rear vessel 120 and the front cover 180. A plurality of light-emitting diodes 142 is arranged over the light source substrate 140.

2-1. Rear Vessel and Front Cover

The rear vessel 120 and the front cover 180 accommodate the light source substrate 140, the light diffuser 170, the prism sheet 174, the reflective polarizing plate 176, and the like structuring the light source device 110. As shown in FIG. 2, the rear vessel 120 has lower side plates 120a to 120d and further includes a bottom plate 120e located between a pair of lower side plates opposing each other (e.g., a pair of the lower side plates 120a and 120b and a pair of the lower side plates 120c and 120d). The bottom plate 120e is connected to the lower side plates 120a to 120d. The bottom plate 120e may be integrated with the lower side plates 120a to 120d. The lower side plates 120a to 120d are preferred to be arranged perpendicular to an upper surface of the bottom plate 120e. With this structure, light from the light-emitting diodes 142 can be efficiently utilized and supplied to the liquid crystal display module 200. One or a plurality of openings 120f is provided to the bottom plate 120e of the rear vessel 120, and a power source is supplied to the light-emitting diodes 142 through these openings 120f.

Similarly, the front cover 180 also includes upper side plates 180a to 180d (the upper side plate 180b is not illustrated in FIG. 2 because it is blocked by an upper plate 180e) as shown in FIG. 2. The front cover 180 further includes the upper plate 180e located between a pair of the upper side plates opposing each other (e.g., a pair of the upper side plates 180a and 180b and a pair of the upper side plates 180c and 180d). The upper plate 180e is connected to the upper side plates 180a to 180d. The upper plate 180e may be integrated with the upper side plates 180a to 180d. An opening 180f is provided to the upper plate 180e through which the light from the light-emitting diodes 142 is supplied to the liquid crystal display module 200. The upper side plates 180a to 180d are also preferred to be arranged perpendicular to an upper surface of the upper plate 180e. With this structure, it is possible not only to efficiently utilize the light from the light-emitting diodes 142 and supply it to the liquid crystal display module 200 but also to reduce an area of the frame region.

The rear vessel 120 and the front cover 180 each include a metal such as aluminum, copper, stainless steel, and the like. For example, the rear vessel 120 can be prepared by cutting or pressing a metal plate with a thickness equal to or more than 1 mm and equal or less than 3 mm or equal to or more than 1 mm and equal to or less than 2 mm. A thickness of the front cover 180 may be different from that of the rear vessel 120. For example, the front cover 180 may be prepared by cutting or pressing a metal plate with a thickness equal to or more than 0.1 mm and equal to or less than 1 mm or equal to or more than 0.1 mm and equal to or less than 0.5 mm.

Note that it is not necessary for the bottom plate 120e and the upper plate 180e to have a flat shape, and the bottom plate 120e and the upper plate 180e may have a curved surface shape. In this case, the light source substrate 140, the light diffuser 170, the prism sheet 174, and the like are configured to match the curved surface shape.

2-2. Light Source Substrate and Light-Emitting Diode

Figure 3A:
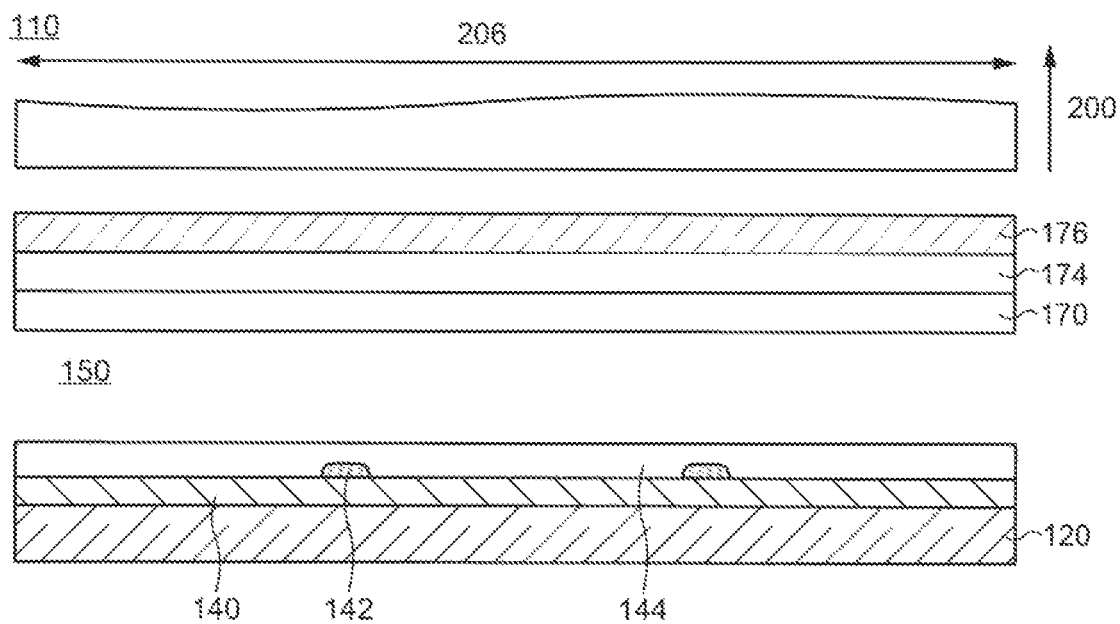
FIG. 3A and FIG. 3B are schematic cross-sectional views of a light source device according to an embodiment of the present invention.

A schematic cross-sectional view of the light source device 110 in the display region 206 is shown in FIG. 3A. As described above, the light source substrate 140 is accommodated in the rear vessel 120. The light source substrate 140 may be in contact with the rear vessel 120.

The plurality of light-emitting diodes 142 is arranged over the light source substrate 140 and overlaps the display region 206. For example, the light-emitting diodes 142 may be arranged in a matrix form, and a distance (pitch) between adjacent light-emitting elements 142 may be arbitrarily set in accordance with the size of the display device 100. For example, the pitch may be selected within a range equal to or more than 1 mm and equal to or less than 20 mm, equal to or more than 3 mm and equal to or less than 15 mm, or equal to or more than 5 mm and equal to or less than 10 mm. It is preferred to arrange the plurality of light-emitting diodes 142 with a uniform pitch in order to supply the light with uniform luminance to the whole of the display region 206.

The light-emitting diode 142 includes a light-emitting element in which an inorganic emitter such as gallium nitride and gallium nitride containing indium is sandwiched by a pair of electrodes and a protecting film for protecting the light-emitting element as fundamental components and is configured to emit light by electroluminescence. As an inorganic emitter, an inorganic compound providing an emission peak between 400 nm and 530 nm may be selected, for example. In this light-emitting diode 142, blue light is extracted through the protecting film. Alternatively, a light-emitting diode configured to provide white light may be used in which a color-converting material is dispersed in the protecting film and the light from the inorganic emitter and the light obtained by converting the light from the inorganic emitter with the color-converting material are mixed.

There is no limitation to the size of each light-emitting diode 142, and a light-emitting diode having a footprint equal to or more than $1.0 \times 10^4$ μm$^2$ and equal to or less than $1.0 \times 10^6$ μm$^2$, equal to or more than $4.0 \times 10^4$ μm$^2$ and equal to or less than $5.0 \times 10^5$ μm$^2$, or equal to or more than $9.0 \times 10^4$ μm$^2$ and equal to or less than $2.5 \times 10^5$ μm$^2$ may be used, for example. As an example, a so-called micro-LED with a size of approximately 320 μm×300 μm may be used as the light-emitting diode 142.

The light source device 110 may further include an overcoat 144 covering the light-emitting diodes 142. The overcoat 144 may be in contact with the light source substrate 140. The overcoat 144 has a function to protect the light-emitting diodes 142 and prevent the light-emitting diodes 142 from separating from the light source substrate 140 and also absorbs depressions and projections caused by the light-emitting diodes 142 to provide a flat surface. Moreover, although the light-emitting diodes 142 provide light with relatively high directivity, the overcoat 144 can spread or diffuse the light from the light-emitting diodes 142.

The overcoat 144 is preferred to have high transmissivity in the visible region and is formed so as to include a polymer material exemplified by an acryl-based resin, a polycarbonate, or a polyester such as poly(ethylene terephthalate), a silicon-containing inorganic compound such as silicon oxide, or the like, for example. A thickness of the overcoat 144 may be arbitrarily set and is preferred to be a thickness allowing the light-emitting diodes 142 to be covered. For example, the thickness thereof may be selected within a range equal to or more than 200 μm and equal to or less than 1 mm, equal to or more than 400 μm and equal to or less than 1 mm, or equal to or more than 500 μm and equal to or less than 800 μm.

2-3. Light Diffuser

The light diffuser 170 is disposed in order to diffuse the light from the light-emitting diodes 142 and provide a uniform emission surface. More specifically, the light diffuser 170 includes a polymer material having high transmissivity with respect to visible light and diffusing particles dispersed in the polymer material. As the polymer material, a polycarbonate, a polyester, or an acrylic resin may be used. The diffusing particles may be an inorganic compound such as calcium carbonate, barium sulfate, titanium dioxide, aluminum hydroxide, silicon oxide, talc, mica, white carbon, magnesium oxide, and zinc oxide or may be a polymer material having a poly(acrylic ester), a poly(methacrylic ester), and polystyrene as a basic skeleton. A thickness of the light diffuser 170 may be selected within a range equal to or more than 0.5 mm and equal to or less than 2 mm or equal to or more than 0.75 mm and equal to or less than 1.5 mm, for example. The highly directive light from the light-emitting diodes 142 is effectively diffused by arranging the light diffuser 170, thereby reducing the luminance distribution in a plane on which the light diffuser 170 is arranged. As a result, it is possible to supply the light to the prism sheet 174 at uniform luminance.

Here, the light diffuser 170 is spaced away from the light-emitting diodes 142 so that a space 150 is formed therebetween. Specifically, the light diffuser 170 is arranged so that a distance (also called an optical distance) from un upper surface of the light source substrate 140 to a bottom surface of the light diffuser 170 is equal to or more than 1 mm and equal to or less than 3 mm or equal to or more than 1.5 mm and equal to or less than 2.5 mm. Hence, the light diffuser 170 and the light-emitting diodes 142 are not in direct contact with each other. The structure for spacing the light diffuser 170 from the light-emitting diodes 142 will be described below.

Figure 3B:
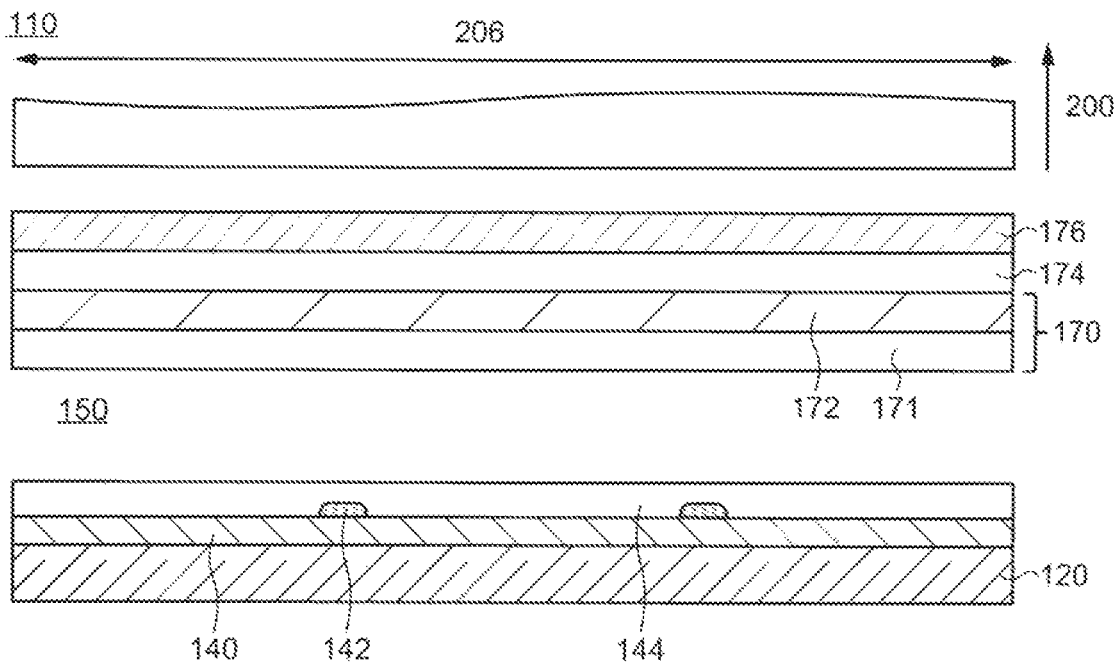

As an optional component, the light diffuser 170 may have a stacked-layer structure including a light-diffusing layer 171 and a wavelength-converting layer 172 as shown in FIG. 3B. The light-diffusing layer 171 includes the aforementioned polymer material having high transmissivity with respect to the visible light and the diffusing particles dispersed in this polymer material. The wavelength-converting layer 172 is a film having a function of converting the wavelength of the light emitted from the light-emitting diodes 142 to generate white light and has a structure in which a fluorescent emitter is dispersed in a polymer material. Similar to the light-diffusing layer 171, the polymer material is selected from a material with high transmissivity in the visible region, such as a polycarbonate, a polyester, and an acrylic resin. The fluorescent emitter includes a fluorescent substance absorbing the blue light emitted from the light-emitting diodes 142 and emitting fluorescence in a green to red region, e.g., a fluorescent substance emitting yellow fluorescence. As a fluorescent substance, an oxide containing yttrium and aluminum is exemplified. In this oxide, a rare earth metal such as cerium, europium, gadolinium, tellurium, and praseodymium may further be included. Alternatively, a quantum dot having a particle diameter of several nanometers to several tens of nanometers may be used instead of the fluorescent emitter.

The wavelength-converting layer 172 may be stacked with the light-diffusing layer 171 as a separately prepared independent film or may be prepared by applying, on the light-diffusing layer 171, a dispersion including the aforementioned polymer material or its precursor and the fluorescent emitter or the quantum dot, followed by performing curing. There is no limitation to the vertical relationship between the light-diffusing layer 171 and the wavelength-converting to layer 172: the light-diffusing layer 171 may be positioned between the light source substrate 140 and the wavelength-converting layer 172 as shown in FIG. 3B, or the wavelength-converting layer 172 may be positioned between the light-diffusing layer 171 and the light source substrate 140 although not illustrated.

2-4. Prism Sheet

The prism sheet 174 is an optical film efficiently radiating the light, which has passed through the light diffuser 170, upwardly, that is, toward the side of the liquid crystal display module 200 and has a structure in which a plurality of prism shapes is arranged in parallel. The prism sheet 174 may have a single-layer structure or may be structured by stacking two films having a plurality of prism shapes on a surface thereof. In the latter case, the two films may be arranged so that the directions in which the prism shapes extend intersect each other. The prism sheet 174 may also contain an acrylic resin, a polycarbonate, a polyester, or the like which is a material with high transmissivity in the visible region.

2-5. Reflective Polarizing Plate

The reflective polarizing plate 176 has a function to transmit polarized light which has passed through the prism sheet 174 and which has a polarizing axis parallel to a transmitting axis of the polarizing plate 216 and to reflect the other light. The former polarized light is extracted as linearly polarized light from the opening 180f of the front cover 180 and is supplied to the liquid crystal display module 200. On the other hand, the latter light returns to the side of the prism sheet 174, and the polarizing axis varies by repeating to reflection and refraction between the prism sheet 174 and the light source substrate 140. When the light with a varied polarized axis again reaches the reflective polarizing plate 176, the polarized light having a polarizing axis parallel to the transmitting axis of the polarizing plate 216 selectively passes through the reflective polarizing plate 176. It is possible to supply most of the light from the light-emitting diodes 142 to the liquid crystal display module 200 by repeating this process, by which the power consumption of the display device 100 can be decreased.

3. Arrangement of Light diffuser and Spacing from Light-Emitting Diode

Figure 4:
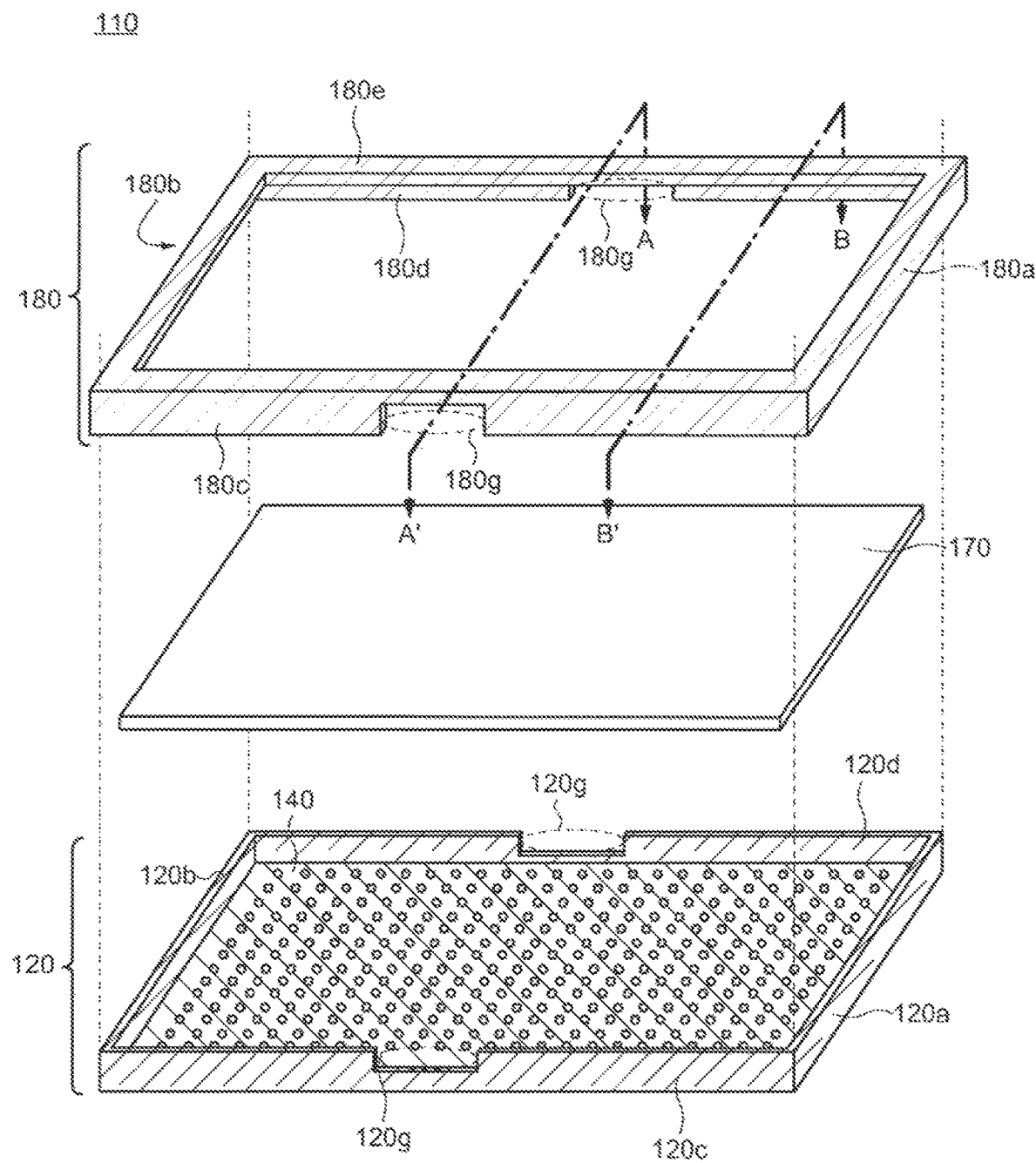
FIG. 4 is a schematic perspective view of a light source device according to an embodiment of the present invention.
Figure 5A:
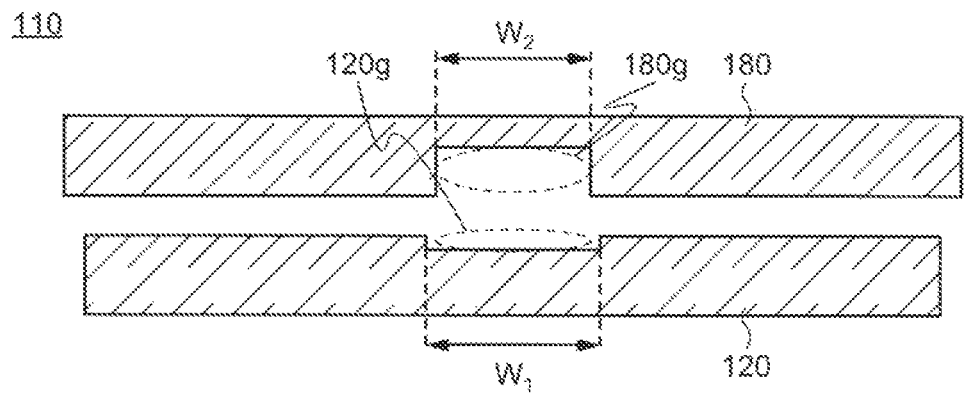
FIG. 5A to FIG. 5D are schematic side views of a light source device according to an embodiment of the present invention.
Figure 5B:
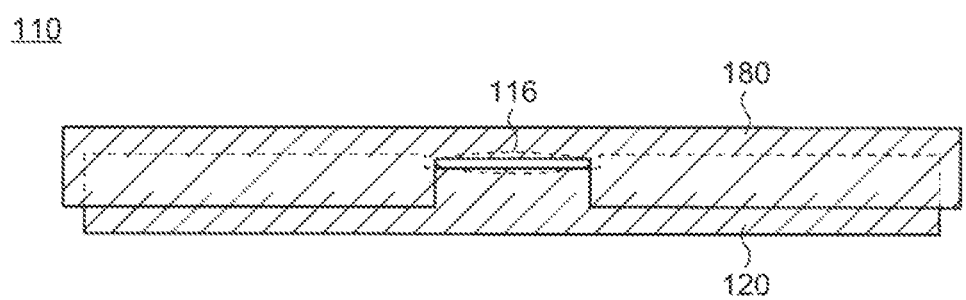
Figure 5C:
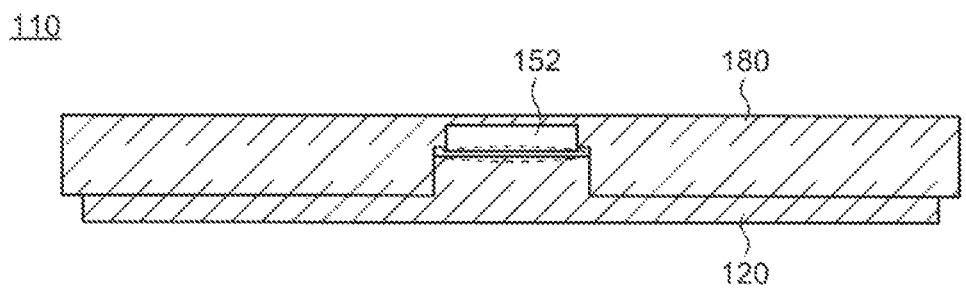
Figure 5D:
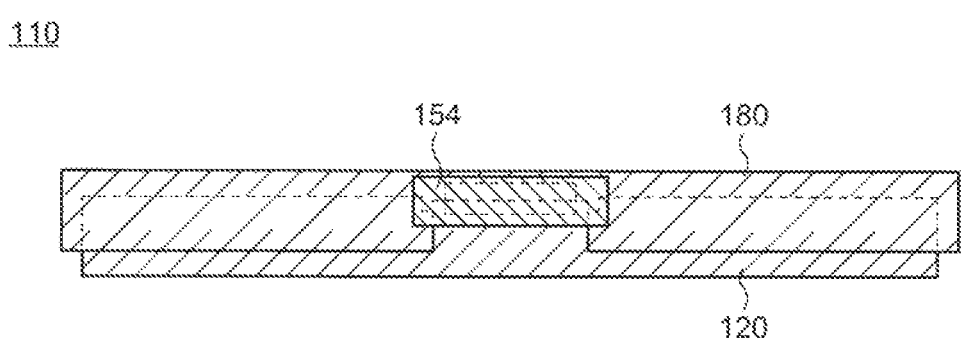

As described above, the light diffuser 170 is arranged to be spaced away from the light-emitting diodes 142, providing the space 150 therebetween in the light source device 110. In the present embodiment, the structure for this purpose is established in the rear vessel 120 and the front cover 180. A schematic perspective view including the rear vessel 120, the light source substrate 140, the light diffuser 170, and the front cover 180 of the light source device 110 of the present embodiment is shown in FIG. 4, and schematic side views of the rear vessel 120 and the front cover 180 are shown in FIG. 5A to FIG. 5D. FIG. 5A represents a state where the rear vessel 120 and the front cover 180 are spaced away from each other, and FIG. 5B to FIG. 5D represent a state where the rear vessel 120 is accommodated in the front cover 180.

As demonstrated in FIG. 4 and FIG. 5A, at least one notch 120g is provided to each of at least one pair of the lower side plates opposing each other in the rear vessel 120. An example is shown in FIG. 4 in which the rear vessel 120 and the front cover 180 each have a rectangular planar shape and one pair of notches 120g is respectively provided to the lower side plates (the lower side plates 120c and 120d in FIG. 4) forming the long sides. However, the notches 120g may be provided to the lower side plates (the lower side plates 120a and 120b in FIG. 4) forming the short sides.

Similarly, in the front cover 180, at least one notch 180g is provided to each of at least one pair of the upper side plates selected from the upper side plates 180a to 180d and opposing each other. Similar to the notches 120g, the notches 180g may be provided to the upper side plates (the upper side plates 180a and 180b in FIG. 4) forming the short sides. The notches 180g are provided to the upper side plates corresponding to the lower side plates provided with the notches 120g. For example, when the notches 120g are provided to the lower side plates forming the long sides, the notches 180g are also provided to the upper side plates forming the long sides. On the other hand, when the notches 120g are provided to the lower side plates forming the short sides, the notches 180g are also provided to the upper side plates forming the short sides. As demonstrated in FIG. 5B, the notches 120g and the notches 180g overlap each other in a direction parallel to the upper surface of the bottom plate 120e in a state where the rear vessel 120 is accommodated in the front cover 180. Hence, there is a gap 116 on a side surface of the light source device 110 between the rear vessel 120 and the front cover 180 in this state. A width $W_1$ of the notch 120g and a width $W_2$ of the notch 180g (a length in a direction in which the lower side plate and the upper side plate respectively provided with the notch 120g and the notch 180g extend) may be arbitrarily set. The widths $W_1$ and the $W_2$ may be the same as each other, or the width $W_1$ may be larger or smaller than the width $W_2$.

Figure 6A:
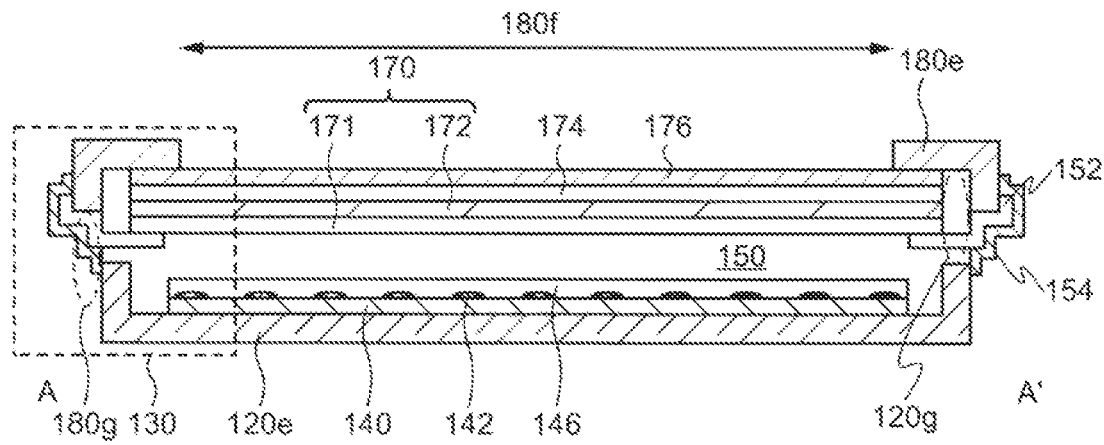
FIG. 6A to FIG. 6C are schematic cross-sectional views of a light source device according to an embodiment of the present invention.
Figure 6B:
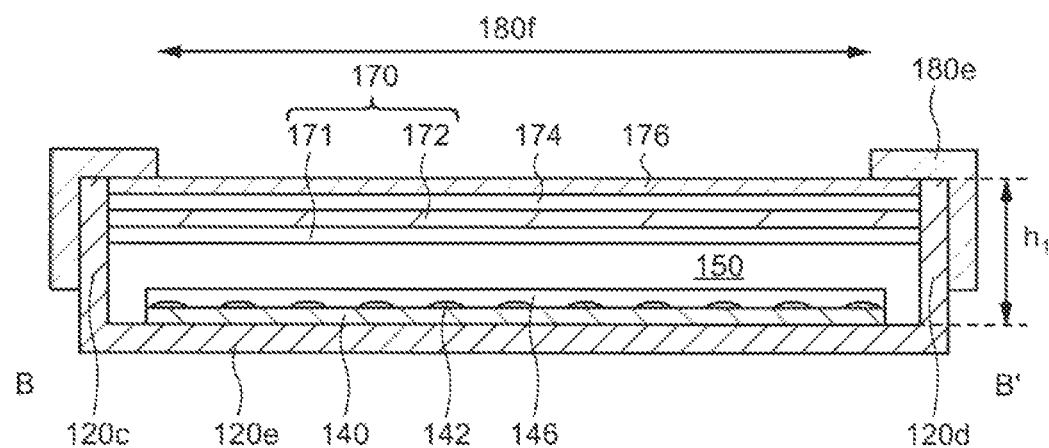

Schematic views of cross sections along chain lines A-A' and B-B' in FIG. 4 are respectively shown in FIG. 6A and FIG. 6B. As shown in FIG. 6A, the light diffuser 170, the prism sheet 174, the reflective polarizing plate 176, and the like are accommodated in the front cover 180. The reflective polarizing plate 176 is arranged so as to be in contact with a bottom surface of the upper plate 180e of the front cover 180. These members are fixed to the front cover 180 with a tape having adhesion (hereinafter, simply referred to as an adhesive tape) 152 (FIG. 6A, FIG. 5C). Hence, the adhesive tape 152 is in contact with the upper side plate provided with the notch 180g. As shown in FIC. 6A, when the light diffuser 170 has the stacked structure of the light-diffusing layer 171 and the wavelength-converting layer 172, the adhesive tape 152 may by in contact with the light-diffusing layer 171. As can be understood from FIG. 6A and FIG. 5C, the adhesive tape 152 is provided to pass through the notch 120g and the notch 180g. Hence, a width of the adhesive tape 152 is equal to or less than the smaller one of the widths $W_1$ and $W_2$.

There is no limitation to the structure of the adhesive tape 152, and a tape in which a pressure-sensitive adhesive is applied over a supporting member can be used. As a material included in the supporting member may be a metal such as aluminum and lead, fiber such as paper, cloth, and glass fiber, or a synthetic polymer such as cellophane, a polyimide, a polyamide, an ethylene-vinyl alcohol copolymer, a polyurethane, a polyolefin exemplified by polyethylene, polypropylene, and poly(vinyl chloride), a polyester exemplified by poly(ethylene terephthalate), a polycarbonate, and a poly(ether sulfone). As the pressure-sensitive adhesive, a rubber-based adhesive, an acryl-based adhesive, an epoxy-based adhesive, a silicone-based adhesive, a urethane-based adhesive, and the like are represented. A thickness of the adhesive tape 152 may be selected within a range equal to or more than 20 µm and equal to or less than 200 µm, equal to or more than 50 µm and equal to or less than 100 µm.

As an optional component, the light source device 110 may further include a light-shielding film 154 covering the adhesive tape 152 (FIG. 5D, FIG. 6A). The light-shielding film 154 is disposed to cover the gap 116 on the side surface of the light source device 110 between the rear vessel 120 and the front cover 180. The light-shielding film 154 may be provided to be in contact with the adhesive tape 152, the rear vessel 120, and the front cover 180. With this structure, it is possible to prevent the light from the light-emitting diodes 142 from leaking through the gap 116.

As shown in FIG. 6B, the lower side plates of the rear vessel 120 (here, the lower side plates 120c and 120d) are in contact with the upper plate 180e of the front cover 180 in a cross section which does not pass through the notch 120g and the notch 180g. This feature determines the positions of the rear vessel 120 and the front cover 180 and the distance therebetween. Hence, the distance between the rear vessel 120 and the front cover 180 and the distance between the light diffuser 170 and the light-emitting diodes 142 are determined by a height $h_1$ (a length in a direction perpendicular to the upper surface of the bottom plate 120e) of a portion of the lower side plate which is not provided with the notch 120g, and the lower side plate is configured so that a value obtained by subtracting thicknesses of the light diffuser 170, the prism sheet 174, the reflective polarizing plate 176, and the light source substrate 140 from the height $h_1$ is equal to or more than 1 mm and equal to or less than 3 mm or equal to or more than 1.5 mm and equal to or less than 2.5 mm. This configuration allows the light diffuser 170 to be spaced from the light-emitting diodes 142, resulting in the space 150 therebetween. A part of the adhesive tape 152 exists in this space 150.

Figure 6C:
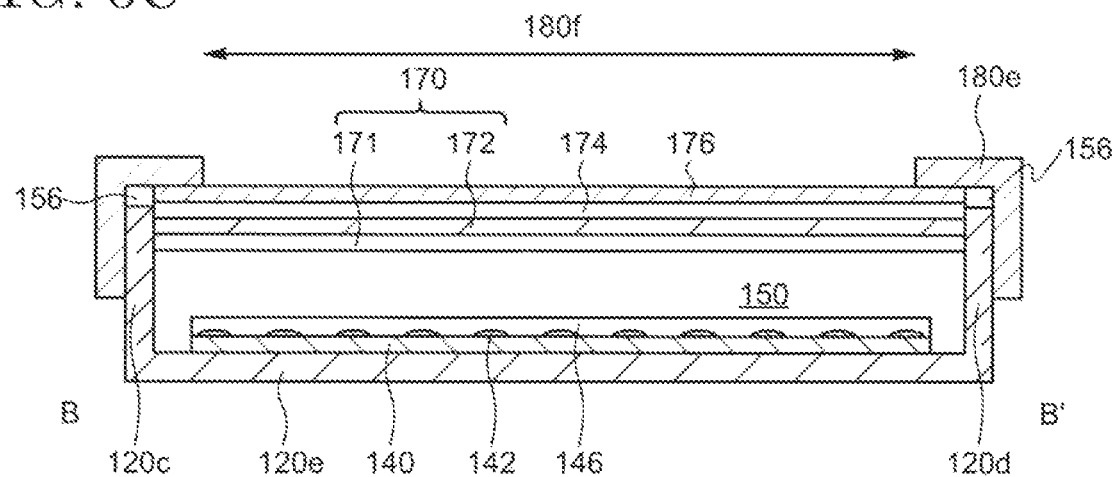

As an optional component, a cushioning material 156 may be disposed over the lower side plates of the rear vessel 120 (FIG. 6C). The cushioning material 156 may be formed over a portion where the notch 120g is not provided. It is preferred that the cushioning material 156 include an elastomer exhibiting rubber elasticity, and, as such a material, a polysiloxane, a poly(acrylic ester), a poly(methacrylic ester), polyacrylonitrile, an epoxy resin, polybutadiene, polyisoprene, a copolymer including any of these polymers as a basic skeleton, or the like is represented. Arrangement of the cushioning material 156 prevents damage caused by the contact of the rear vessel 120 with the front cover 180.

Figure 7A:
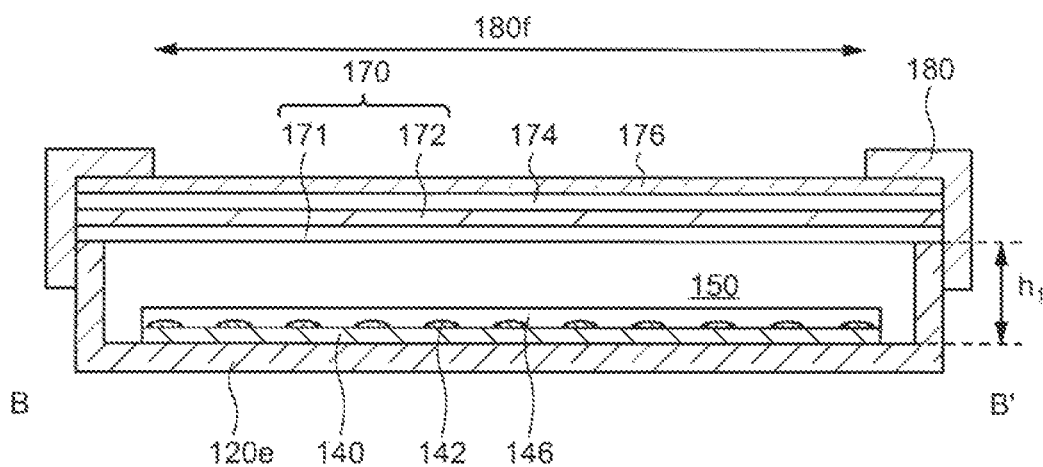
FIG. 7A and FIG. 7B are schematic cross-sectional views of a light source device according to an embodiment of the present invention.
Figure 7B:
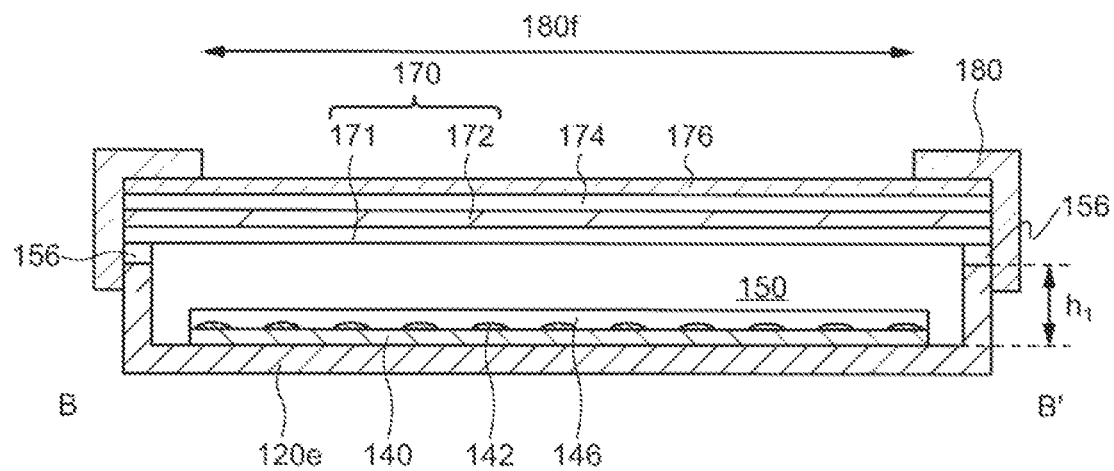

Although the structures are demonstrated by the examples shown in FIG. 6A to FIG. 6C in which the light diffuser 170, the prism sheet 174, and the reflective polarizing plate 176 do not overlap the lower side plates of the rear vessel 120, all of or a part of these components may overlap the lower side plate of the rear vessel 120. For example, the light diffuser 170 may be arranged to overlap the lower side plates of the rear vessel 120 as shown in FIG. 7A. In this case, the cushioning material 156 may also be provided so as to be in contact with the light diffuser 170 (FIG. 7B), by which the damage of the light diffuser 170 and the like caused by the contact with the rear vessel 120 can be prevented. In such a structure, the lower side plates are configured so that a difference between the height $h_1$ and the thickness of the light source substrate 140 is equal to or more than 1 mm and equal to or less than 3 mm or equal to or more than 1.5 mm and equal to or less than 2.5 mm. In the case where the cushioning material 156 is provided, the lower side plates are configured so that a value obtained by subtracting the thickness of the light source substrate 140 from a summation of the height $h_1$ and a thickness of the cushioning material 156 is equal to or more than 1 mm and equal to or less than 3 mm or equal to or more than 1.5 mm and equal to or less than 2.5 mm.

Figure 8A:
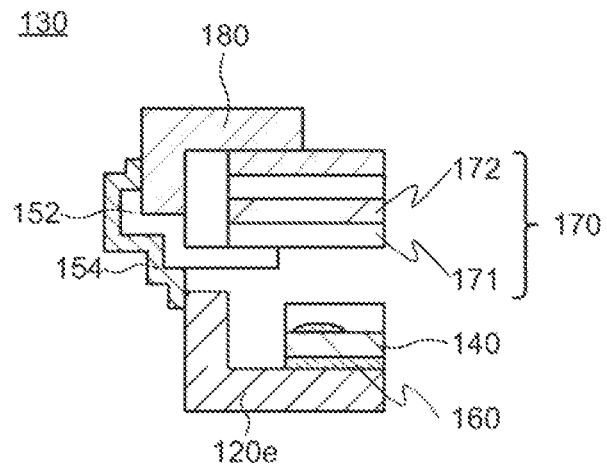
FIG. 8A to FIG. 8C are schematic cross-sectional views of a light source device according to an embodiment of the present invention.
Figure 8B:
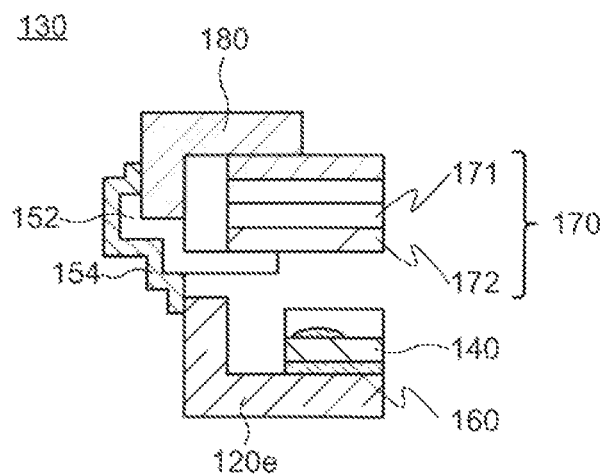
Figure 8C:
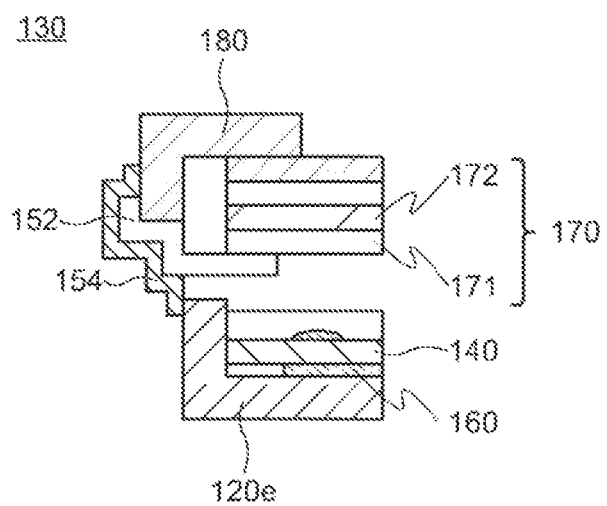

Enlarged views of a region 130 in FIG. 6A are shown in FIG. 8A to FIG. 8C. Although the light source substrate 140 may be arranged to be in direct contact with the upper surface of the bottom plate 120e of the rear vessel 120 as described above, the light source substrate 140 may be fixed to the bottom plate 120e using an adhesive layer 160 as shown in FIG. 8A. When the light diffuser 170 has the stacked structure of the light-diffusing layer 171 and the wavelength-converting layer 172, the light-diffusing layer 171 may be in contact with the adhesive tape 152 as shown in FIG. 8A, or the wavelength-converting layer 172 may be placed between the light-diffusing layer 171 and the light-emitting diodes 142 so that the adhesive tape 152 is in contact with the wavelength-converting layer 172 as shown in FIG. 8B. In addition, the light source substrate 140 may be arranged so as to be in contact with the lower side plate of the rear vessel 120.

Figure 9A:
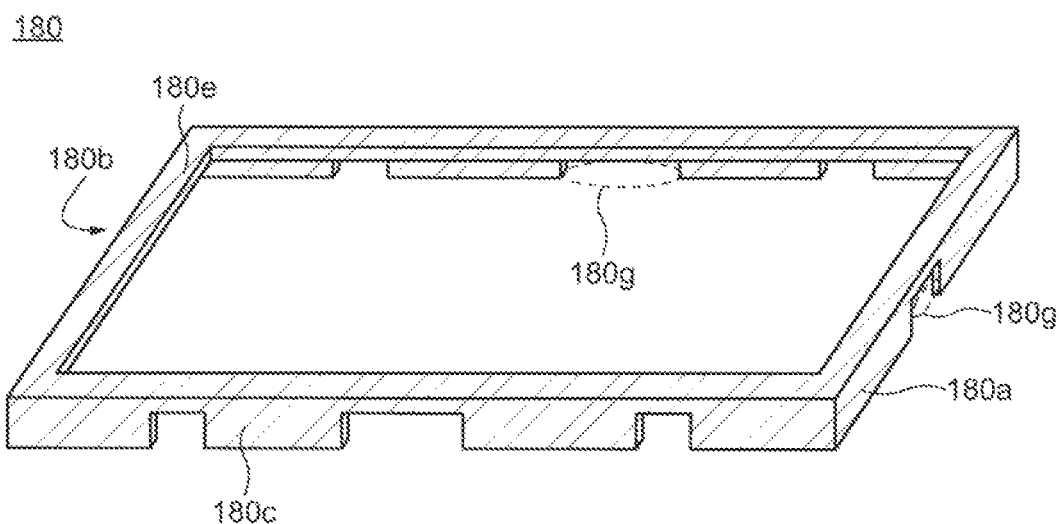
FIGS. 9A and 9B are schematic perspective views of a light source device according to an embodiment of the present invention.
Figure 9B:
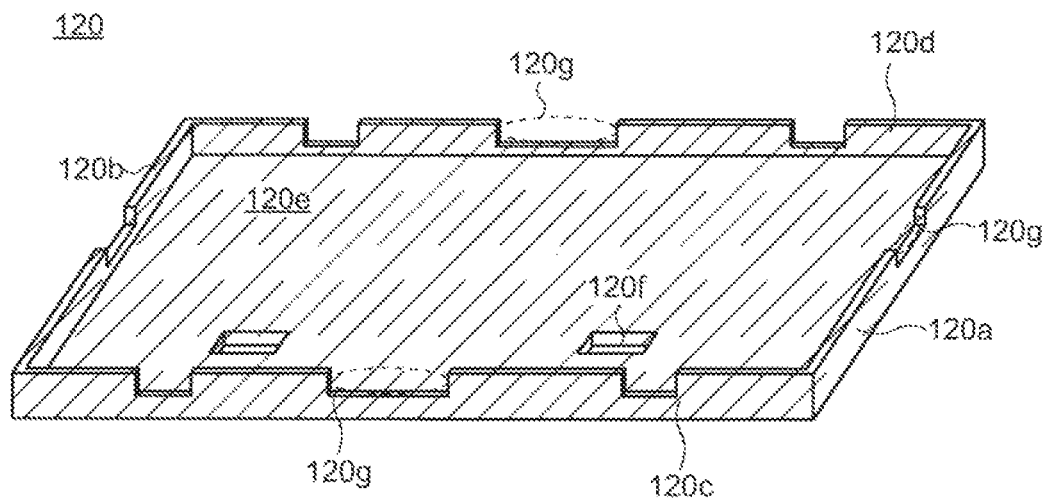

The arrangement of the notches 120g and 180g may be arbitrarily determined. For example, one or more notches 180 may be arranged in each of two opposing upper side plates in the front cover 180 as shown in FIG. 9A. For example, two notches 180g may be arranged in each of two opposing upper side plates. Alternatively, one notch 180g is arranged in one upper side plate while two notches 180g may be arranged in the opposing upper side plate. Alternatively, one or plural notches 180g may be formed in all of the upper side plates. The same is applied to the rear vessel 120, and one or more notches may be arranged in each of two opposing lower side plates as shown in FIG. 9B. For example, two notches 120g may be arranged in each of two opposing lower side plates. Alternatively, one notch 120g may be arranged in one lower side plate, while two notches 120g may be arranged in the opposing lower side plate. Alternatively, one or more notches 120g may be formed in all of the lower side plates.

As described above, in the light source device 110, light source substrate 140 over which the plurality of light-emitting diodes 142 is arranged is accommodated in the rear vessel 120, whereas the light diffuser 170, the prism sheet 174, and the reflective polarizing plate 176 are accommodated in and fixed to the front cover 180. The rear vessel 120 is accommodated in the front cover 180. The liquid crystal display module 200 is arranged over this light source device 110 to structure the display device 100. Here, the notches 120g are provided to the lower side plates of the rear vessel 120, and the notches 180g are also provided to the corresponding upper side plates of the front cover 180 in the light source device 110. In addition, the distance between the rear vessel 120 and the front cover 180 can be adjusted by the height $h_1$ of the lower side plates of the rear vessel 120. Accordingly, the space 150 is generated between the light source substrate 140 and the light diffuser 170, and a sufficient gap is provided therebetween. Hence, even when the highly directive light is radiated from the light-emitting diodes 142, the light spreads in the space 150 between the light source substrate 140 and the light diffuser 170. Moreover, the light is decreased in directivity by repeating reflection in the space 150. As a result, localized generation of a region (hot spot) with high luminance can be prevented at the bottom surface of the light diffuser 170. When the light which has a decreased intensity distribution by the space 150 between the light source substrate 140 and the light diffuser 170 in this manner passes through the light diffuser 170, the light is further diffused by the diffusing particles. In addition, the fluorescent emitter included in the wavelength-converting layer 172 also contributes to the light diffusion. With this mechanism, the light with uniform luminance can be provided to the prism sheet 174. Therefore, the light with uniform intensity can be supplied to the display region 160, allowing the display device 100 to realize high quality display.

Furthermore, the light-emitting diodes 142 serving as a light source can be arranged under the display region 206, that is, under the light diffuser 170 in the display device 100 of the present embodiment. Hence, compared with the structure in which a light source is arranged in a frame region, it is not necessary to arrange a reflective plate for reflecting the light toward the liquid crystal display module 200, thereby reducing the number of components structuring the light source device. This feature contributes to thinning of a display device. Moreover, since it is not necessary to arrange a light source in the frame region, it is possible to reduce the frame region and increase an area of the display region 206 with respect to the whole of the display device 100. Hence, implementation of the present embodiment enables the production of a display device having an excellent design.

Second Embodiment

In the present embodiment, a light source device 112 including a rear vessel 122 with a different structure from the rear vessel 120 described in the First Embodiment as well as a display device 102 including the light source device 112 are explained. An explanation of the structures the same as or similar to those described in the First Embodiment may be omitted.

Figure 10:
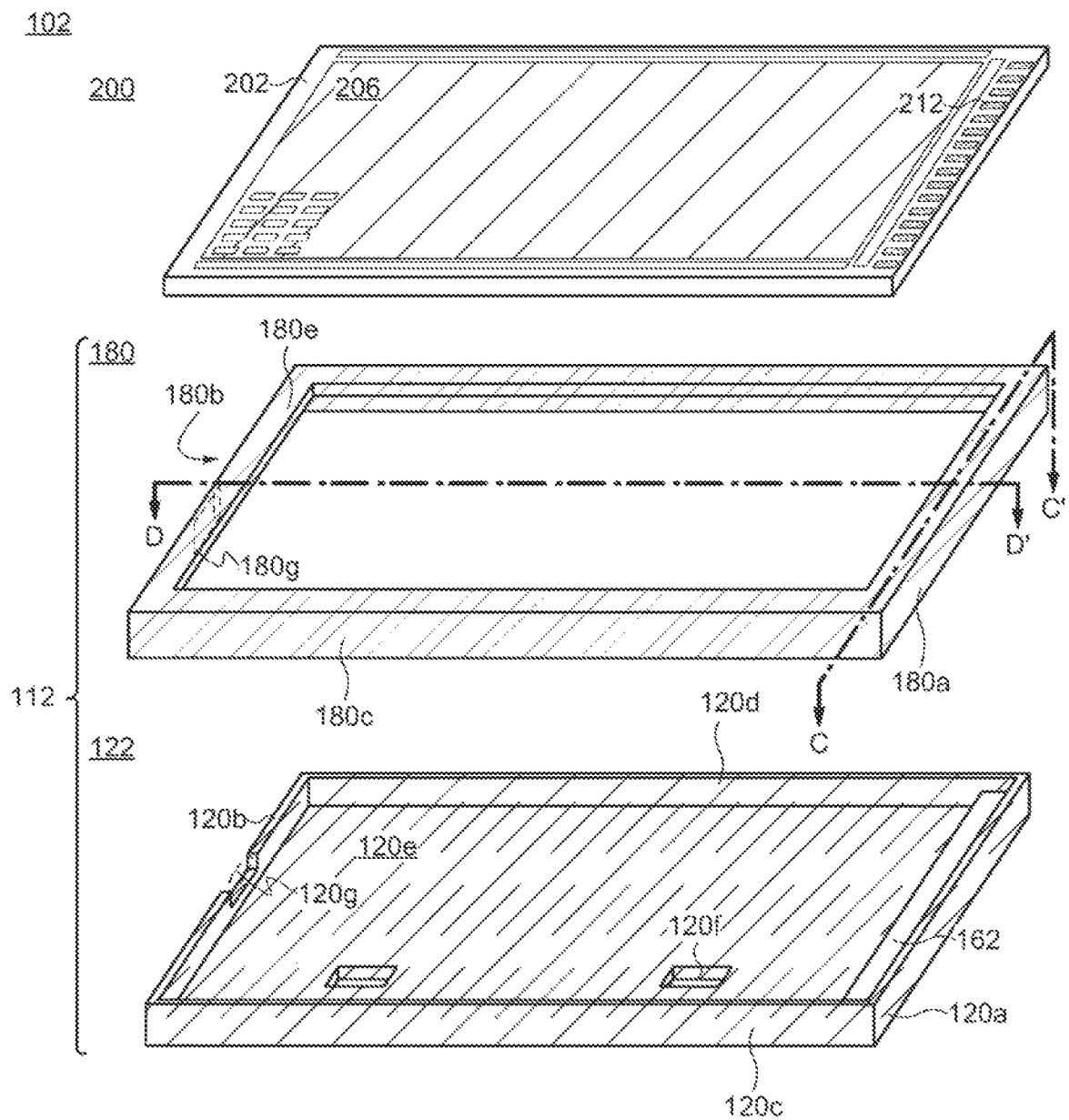
FIG. 10 is a schematic perspective view of a light source device according to an embodiment of the present invention.

The rear vessel 122 of the present embodiment is different from the rear vessel 120 in that it includes a spacer 162 along the lower side plate opposing the lower side plate provided with the notch 120g. For example, the spacer 162 extending parallel to a direction in which the lower side plate 120a extends is arranged along the lower side plate 120a opposing the lower side plate 120b provided with the notch 120g as shown in FIG. 10. No notch may be provided to the lower side plate 120a opposing the lower side plate 120b provided with the notch 120g.

There is no limitation to a material included in the spacer 162. Not only can a polymer material with high transmissivity with respect to the visible light be used, such as a polycarbonate, a polyester, and an acrylic resin, but also a variety of polymer materials such as an epoxy resin, a polyimide resin, a polyamide resin, a polyolefin resin, and a fluorine-containing polyolefin resin may be used. Alternatively, the spacer 162 may be composed of a metal or an alloy such as aluminum, copper, iron, zinc, brass, and stainless steel.

Figure 11A:
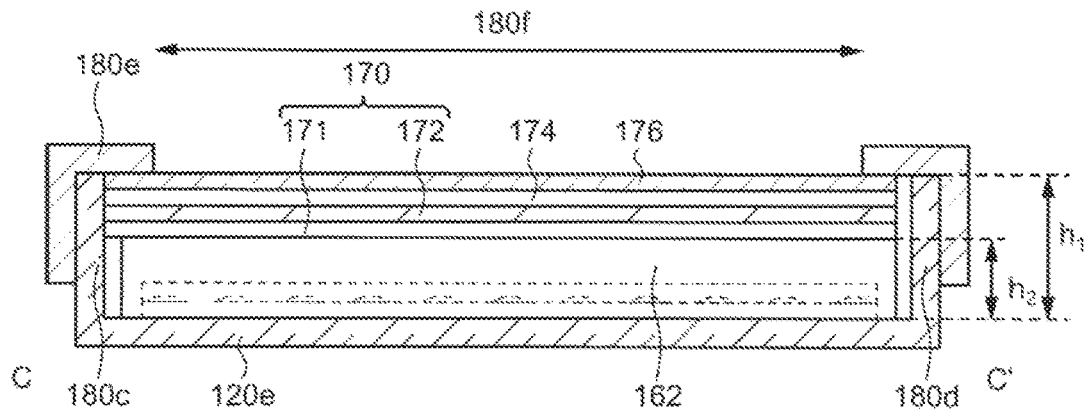
FIG. 11A to FIG. 11C are schematic cross-sectional views of a light source device according to an embodiment of the present invention.
Figure 11B:
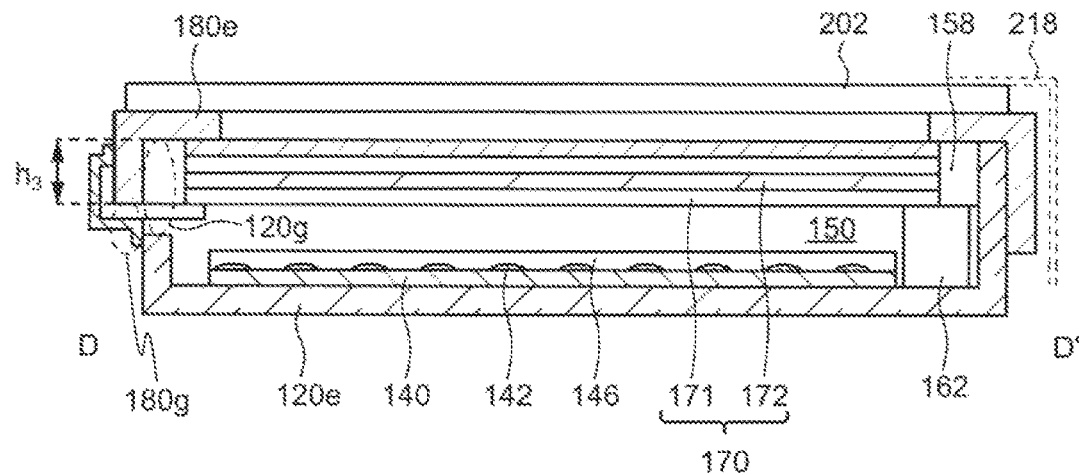

Schematic views of cross sections along chain lines C-C' and D-D' in FIG. 10 are respectively illustrated in FIG. 11A and FIG. 11B. As shown in FIG. 11A, the spacer 162 is disposed so as to be in contact with the light diffuser 170 or to overlap the light diffuser 170 through a cushioning material which is not illustrated. Although not illustrated, when the light diffuser 170 has the aforementioned stacked-layer structure and the wavelength-converting layer 172 is placed between the light-emitting diodes 142 and the light-diffusing layer 171, the spacer 162 is arranged so as to be in contact with the wavelength-converting layer 172 or to overlap the wavelength-converting layer 172 through the cushioning material. The spacer 162 may be spaced away from the lower side plate (the lower side plates 120c and 120d in FIG. 10) extending perpendicular to a direction in which the spacer 162 extends or may be in contact therewith although not illustrated.

As demonstrated in FIG. 11B, the spacer 162 is arranged so that the plurality of light-emitting diodes 142 is sandwiched by the lower side plate provided with the notch 120g and the spacer 162. Similar to the First Embodiment, the light diffuser 170, the prism sheet 174, the reflective polarizing plate 176, and the like are accommodated in the front cover 180. These components are fixed to the front cover 180 with the adhesive tape 152 on the side of the lower side plate provided with the notch 120g. That is, the light diffuser 170, the prism sheet 174, the reflective polarizing plate 176, and the like are fixed by the adhesive tape 152 and the spacer 162 in the light source device 112. Hence, the spacer 162 is configured so that a difference between its height $h_2$ and the thickness of the light source substrate 140 is equal to or more than 1 mm and equal to or less than 3 mm or equal to or more than 1.5 mm and equal to or less than 2.5 mm. In addition, the lower side plates are configured so that a value obtained by subtracting the thicknesses of the light diffuser 170, the prism sheet 174, the reflective polarizing plate 176, and the light source substrate 140 from the height $h_2$ of the spacer 162 is equal to or more than 1 mm and equal to or less than 3 mm or equal to or more than 1.5 mm and equal to or less than 2.5 mm.

The light diffuser 170, the prism sheet 174, and the reflective polarizing plate 176 may be in contact with or may not be in contact with the lower side plate 120a opposing the lower side plate 120b provided with the notch 120g. In the former case, a cushioning material 158 may be disposed as an optional component between the lower side plate opposing the lower side plate provided with the notch 120g and the light diffuser 170, the prism sheet 174, and the reflective polarizing plate 176. The cushioning material 158 is arranged over the spacer 162. With this structure, the damage of the components such as the light diffuser 170 caused by the contact with the rear vessel 122 can be prevented. The cushioning material 158 may include the material usable for the cushioning material 156 described in the First Embodiment.

Figure 11C:
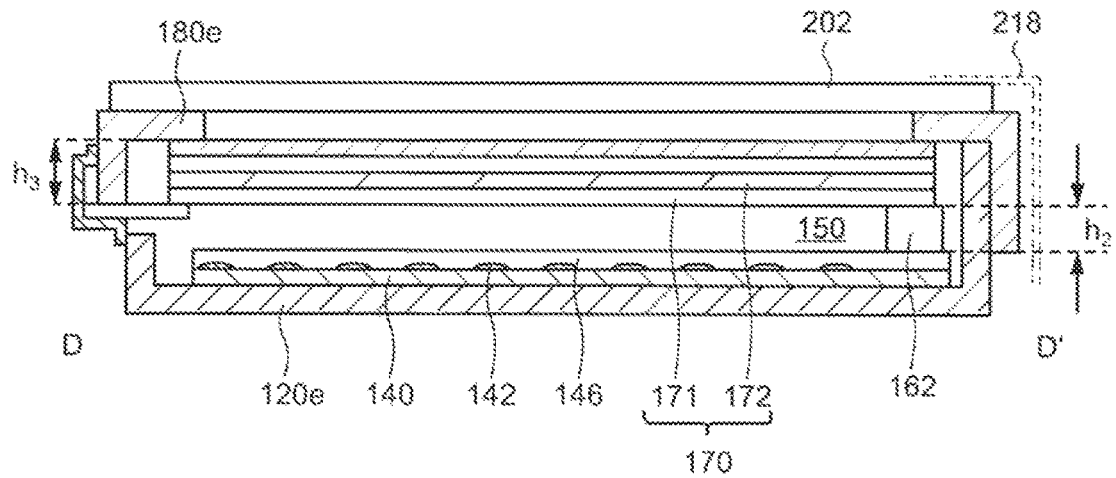

Alternatively, the spacer 162 may be arranged over the light source substrate 140 to overlap the light source substrate 140 as shown in FIG. 11C. In this case, the plurality of light-emitting diodes 142 is also sandwiched by the lower side plate provided with the notch 120g and the spacer 162. In this case, the spacer 162 is configured so that its height $h_2$ (a summation of its height $h_2$ and a thickness of the overcoat 144 when the overcoat 144 is formed) is equal to or more than 1 mm and equal to or less than 3 mm or equal to or more than 1.5 mm and equal to or less than 2.5 mm. On the other hand, the lower side plates are configured so that a value obtained by subtracting the thicknesses of the light diffuser 170, the prism sheet 174, the reflective polarizing plate 176, and the light source substrate 140 (a summation further including the thickness of the overcoat 144 when the overcoat 144 is provided) from the height $h_1$ of the spacer 162 is equal to or more than 1 mm and equal to or less than 3 mm or equal to or more than 1.5 mm and equal to or less than 2.5 mm.

As described above, the terminals 212 are formed for supplying the variety of signals and the power source to the liquid crystal display module 200 from the outside, and a connector 218 such as a flexible printed circuit (FPC) substrate is connected to the terminals 212 (see FIG. 1 and FIG. 11B). Generally, the frame region on the side of the terminals 212 is wider than the frame region on the opposite side. Hence, it is preferred that the notch 120g be fabricated on the opposite side to the terminals 212 of the liquid crystal display module 200 and that the spacer 162 be arranged on the terminals 212 side. With this arrangement, the relatively wide frame region can be efficiently utilized for arranging the spacer 162. Therefore, when the terminals 212 are arranged on the side of the long side of the liquid crystal display module 200, it is preferred that the notch 120g be provided to one of the lower side plates forming the long sides of the rear vessel 122 (the lower side plate 120c or 120d in FIG. 10) and that the spacer 162 be arranged on the side of the opposing lower side plate thereto.

In the light source device 112, the position of the light diffuser 170 is fixed by the adhesive tape 152 passing through the notch 120g and the spacer 162, resulting in the space 150 for spacing the light diffuser 170 away from the light-emitting diodes 142. Hence, the highly directive light from the light-emitting diodes 142 is efficiently diffused by the space 150 and the light-diffusing ability of the light diffuser 170, allowing the light with uniform luminance to enter the prism sheet 174. Accordingly, the light with uniform luminance is supplied to the display region 206, enabling the display device 102 to realize high quality display.

Third Embodiment

In the present embodiment, a light source device 114 including a rear vessel 124 with a different structure from the rear vessels 120 and 122 described in the First and Second Embodiments as well as a display device 104 including the light source device 114 are explained. An explanation of the structures the same as or similar to those described in the First and Second Embodiments may be omitted.

Figure 12A:
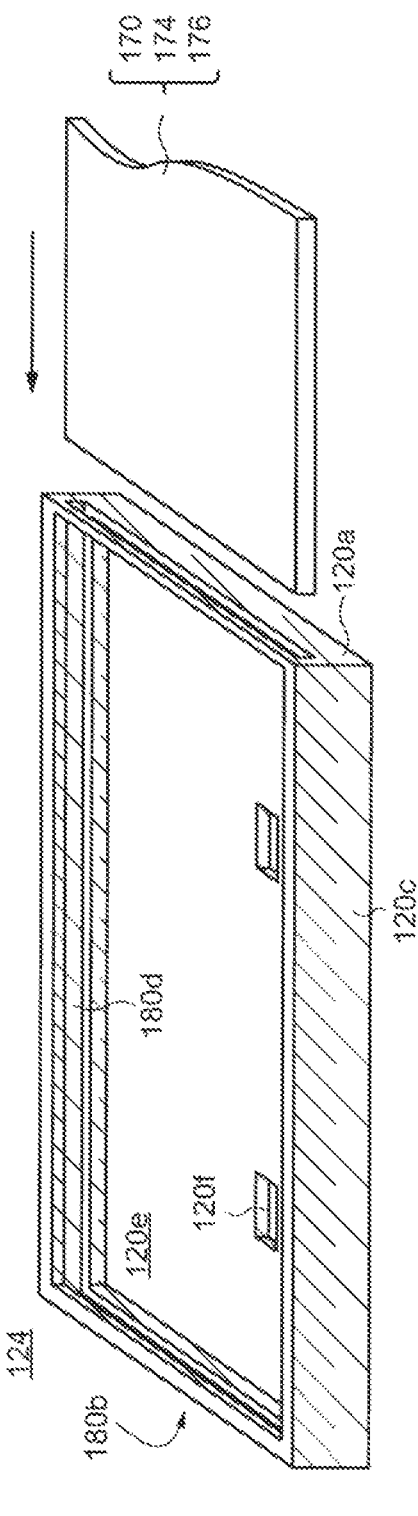
FIG. 12A and FIG. 12B are schematic perspective views of a light source device according to an embodiment of the present invention.
Figure 12B:
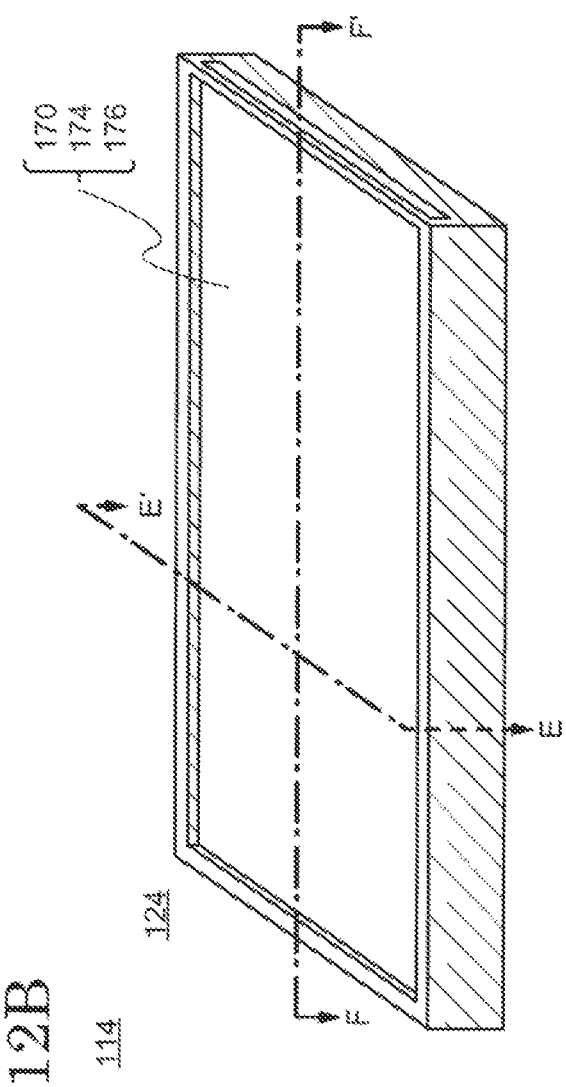
Figure 13A:
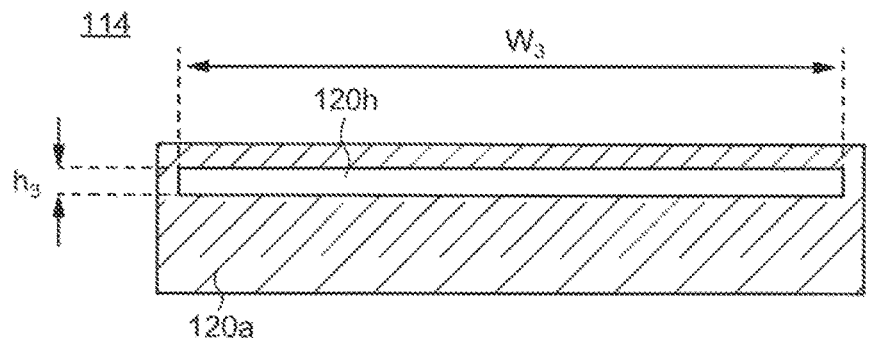
FIG. 13A is a schematic side view and FIG. 13B to FIG. 13D are schematic cross-sectional views of a light source device according to an embodiment of the present invention.
Figure 13B:
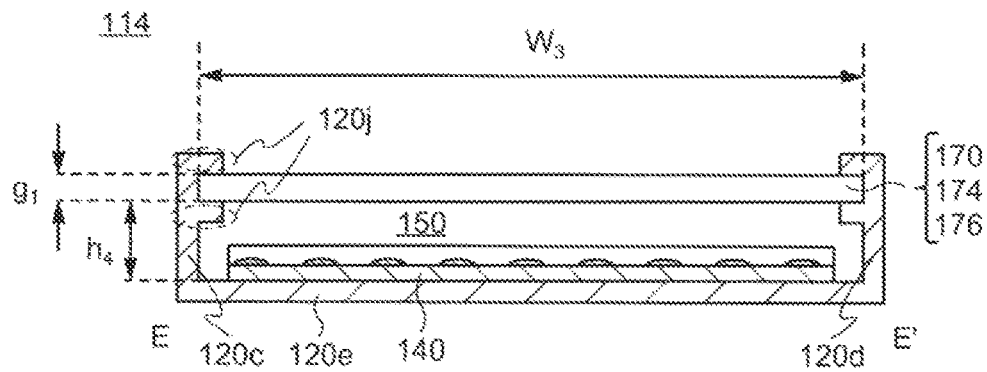
Figure 13C:
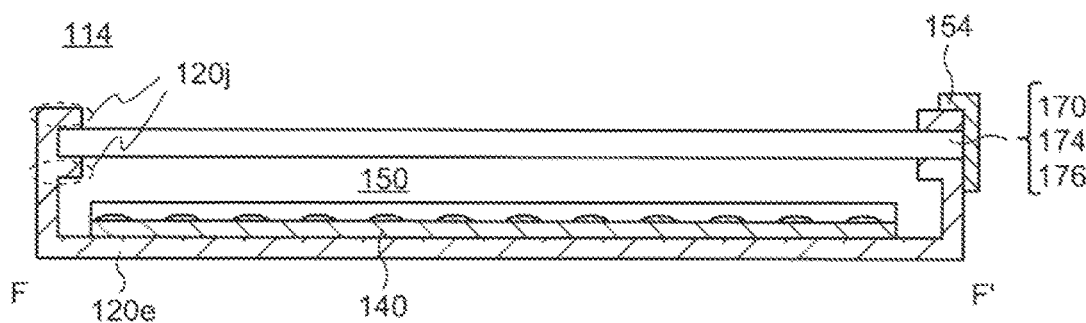

Schematic perspective views of the light source device 114 are shown in FIG. 12A and FIG. 12B. FIG. 13A is a schematic side view of the rear vessel 124, whereas FIG. 13B and FIG. 13C are respectively schematic views of cross sections along chain lines E-E' and F-F' in FIG. 12B. FIG. 12A represents a state before accommodating the light diffuser 170, the prism sheet 174, the reflective polarizing plate 176, and the like in the rear vessel 124, while FIG. 12B represents a state where these components are accommodated in the rear vessel 124. In FIG. 12A and FIG. 12B, no hatching is provided to the bottom plate 120e and the planes parallel to the upper surface thereof.

As demonstrated by FIG. 12A and FIG. 13A, one of the lower side plates of the rear vessel 124 (here, the lower side plate 120a) is provided with an opening 120h. The opening 120h is prepared to allow the light diffuser 170, the prism sheet 174, and the reflective polarizing plate 176 to pass therethrough. Hence, the opening 120h is formed so that its height $h_3$ (a length in the direction perpendicular to the upper surface of the bottom plate 120e) is equal to or more than the summation of the thicknesses of the light diffuser 170, the prism sheet 174, and the reflective polarizing plate 176 and that a width $W_3$ thereof (a length in a direction in which the lower side plate provided with the opening 120h extends) is equal to or more than the maximum among the widths of the light diffuser 170, the prism sheet 174, and the reflective polarizing plate 176.

On the other hand, a pair of protruding portions 120j extending parallel to the upper surface of the bottom plate 120e is fabricated on inner surfaces of the lower side plates (here, the lower side plates 120c and 120d) whose extending directions intersect that of the lower side plate provided with the opening 120h as shown in FIG. 12A and FIG. 13B. Hereinafter, the protruding portion 120j closer to the bottom plate 120e is also referred to as an underside guide, while the other protruding portion 120j is also referred to an upside guide. The protruding portions 120j protrude toward the opposing lower side plate. A trench extending parallel to the upper surface of the bottom plate 120e is formed on each of the lower side plates opposing each other by the pair of protruding portions 120j. The protruding portions 120j are prepared so that a width of the trench, that is, a gap gi between the pair of protruding portions 120j (a length of the trench in the direction perpendicular to the upper surface of the bottom plate 120e) is equal to or more than the summation of the thicknesses of the light diffuser 170, the prism sheet 174, and the reflective polarizing plate 176. The gap gi may be the same as the height $h_3$. Moreover, a height $h_4$ of the underside guide, that is, a distance from the upper surface of the bottom plate 120e to an upper surface of the underside guide, is the same or substantially the same as a distance from the upper surface of the bottom plate 120e to the opening 120h in the direction perpendicular to the upper surface of the bottom plate 120e. The protruding portions 120j and the opening 120h are fabricated so that a difference between the height ha and the thickness of the light source substrate 140 is equal to or more than 1 mm and equal to or less than 3 mm or equal to or more than 1.5 mm and equal to or less than 2.5 mm. Thus, the trench and the opening 120h overlap each other in a side view.

Figure 13D:
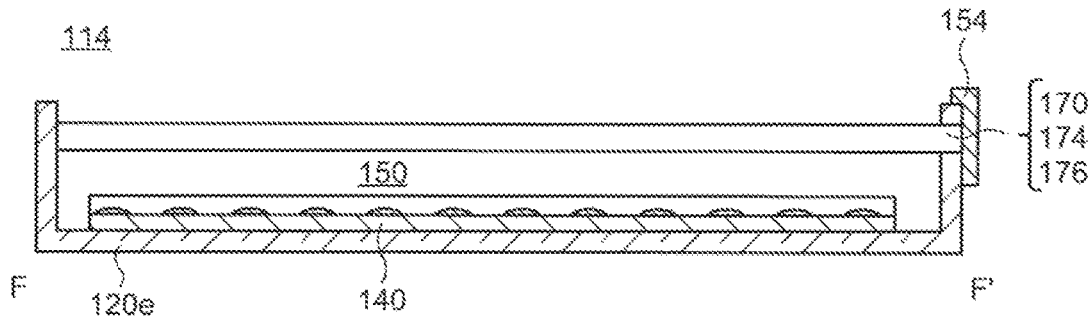

The pair of protruding portions 120j may also be fabricated on the lower side plate (here, the lower side plate 120b) opposing the lower side plate provided with the opening 120h (FIG. 13C), or no protruding portion 120j may be fabricated thereon (FIG. 13D). Alternatively, the pair of protruding portions 120j may be fabricated on the lower side plate 120b, and no protruding portion 120j may be fabricated on the lower side plates (the lower side plates 120c and 120d) whose extending directions intersect that of the lower side plate 120b). Note that in the light source device 114 of the present embodiment, it is not necessary for the bottom plate 120e and the lower side plates 120a to 120d to be integrated with one another, and all of or a part of these components may be an independent member. In this case, the bottom plate 120e and the lower side plates 120a to 120d are connected and fixed to one another by welding or screwing or by using an adhesive, an adhesive tape, or the like.

With this structure, the light diffuser 170, the prism sheet 174, and the reflective polarizing plate 176 can be inserted into the rear vessel 124 along the pair of trenches from the opening 120h and can be fixed (FIG. 12B, FIG. 13B). Therefore, both edge portions of each of the light diffuser 170, the prism sheet 174, and the reflective polarizing plate 176 are located in the trenches and sandwiched by the pairs of protruding portions 120j. When the pair of protruding portions 120j is also fabricated on the lower side plate opposing the lower side plate provided with the opening 120h, other edge portions of the light diffuser 170, the prism sheet 174, and the reflective polarizing plate 176 are located in the trench formed on this lower side plate. Note that, edge portions of the light diffuser 170, the prism sheet 174, and the reflective polarizing plate 176 may be located in the opening 120h as shown in FIG. 13C. In addition, the light source device 114 may include the light-shielding film 154 covering the opening 120h and the light diffuser 170 inserted in the rear vessel 124 as an optional component (FIG. 13C, FIG. 13D). With this structure, it is possible to prevent the light emitted from the light-emitting diodes 142 from leaking through the opening 120h or a side surface of the light diffuser 170 to the outside.

In the rear vessel 124, the space 150 is formed between the light-emitting diodes 142 and the light diffuser 170 by the trench formed by the pair of protruding portions 120j, and the distance between the light-emitting diodes 142 and the light diffuser 170 can be controlled by the height ha of the underside guide. Hence, the light from the light-emitting diodes 142 can be efficiently diffused, which allows the light with uniform luminance to enter the prism sheet 174 as described in the First and Second Embodiments. Accordingly, the light with uniform luminance can be supplied to the display region 206, enabling the display device 104 to realize high quality display.

In the examples demonstrated in FIG. 12A to 13D, the light diffuser 170, the prism sheet 174, and the reflective polarizing plate 176 are inserted into the rear vessel 124. Hence, the front cover 180 may not be disposed in the light source device 114 of the present embodiment.

Figure 14A:
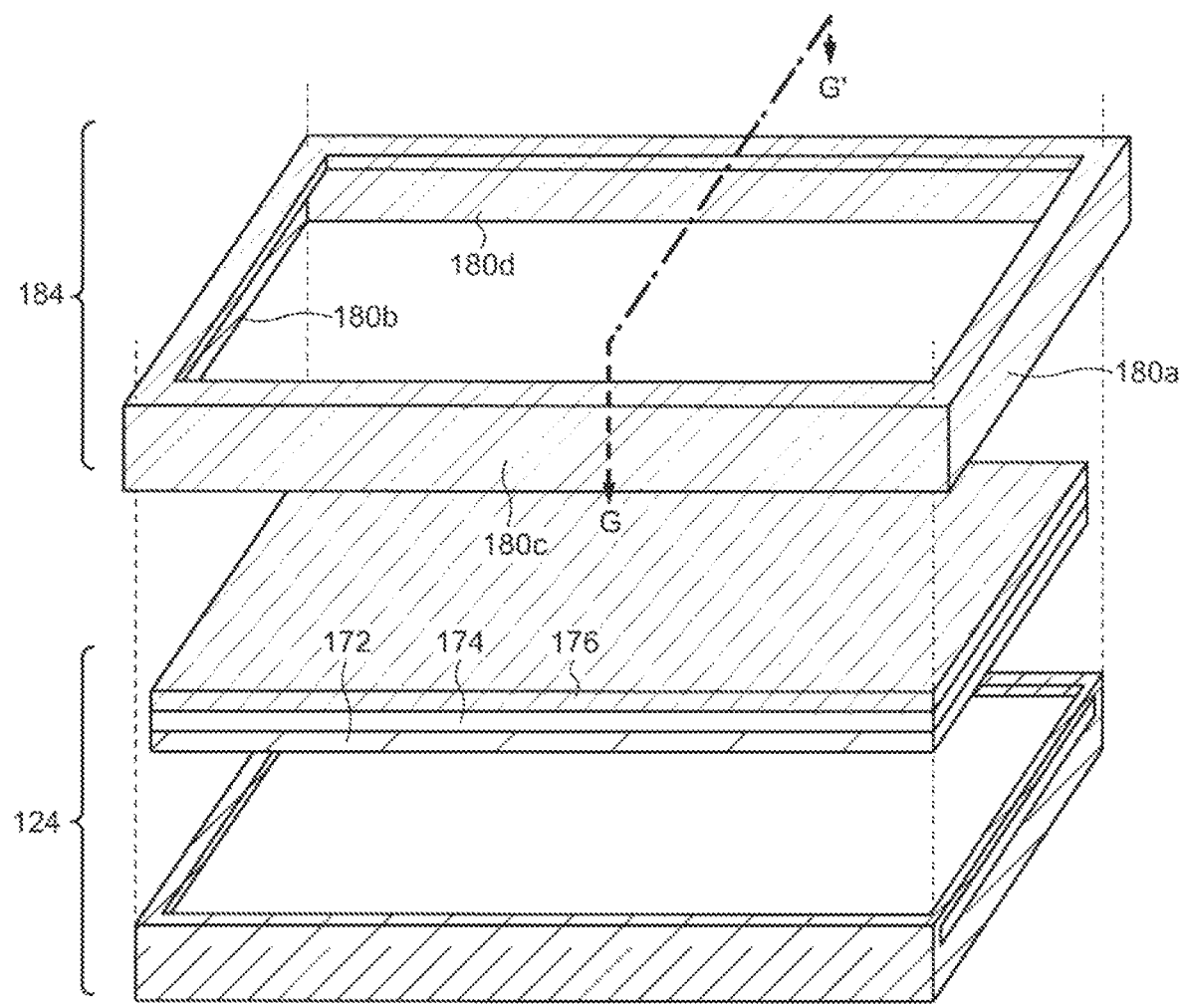
FIG. 14A is a schematic perspective view.
Figure 14B:
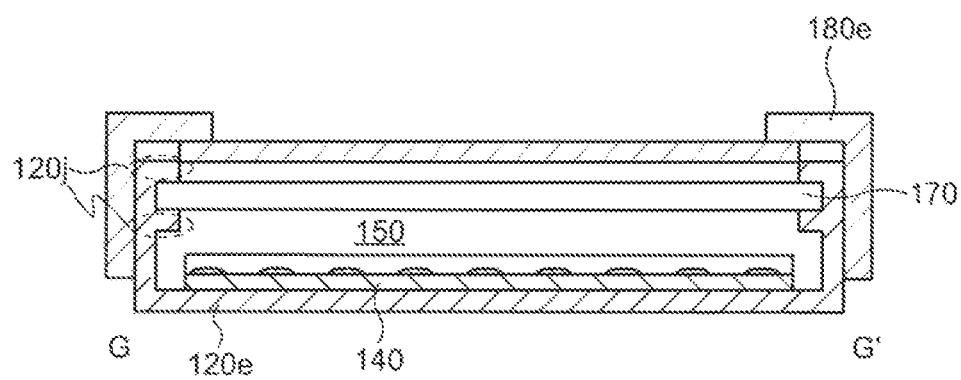
FIG. 14B is a schematic cross-sectional view of a light source device according to an embodiment of the present invention.

However, the structure of the light source device 114 of the present embodiment is not limited thereto, and a part of the light diffuser 170, the prism sheet 174, and the reflective polarizing plate 176 may be inserted to the rear vessel 124 to be fixed, and other components may be disposed between the rear vessel 124 and the front cover 180. For example, the rear vessel 124 may be configured so that only the light diffuser 170 is inserted along the trenches from the opening 120h as shown in a perspective view of FIG. 14A and a schematic view (FIG. 14B) of a cross section along a chain line G-G' in FIG. 14A. In this case, the opening 120h is formed so that its height $h_3$ and width $W_3$ are equal to or larger than the thickness and the width of the light diffuser 170, respectively. In addition, the pair of protruding portions 120j is also fabricated so that the gap gi is equal to or larger than the thickness of the light diffuser 170.

When the rear vessel 124 having such as structure is used, the front cover 180 for accommodating the rear vessel 124 is disposed over the rear vessel 124, and the prism sheet 174, the reflective polarizing plate 176, and the like are sandwiched therebetween. Although not illustrated, the light source device 114 may be configured so that only the light diffuser 170 and the prism sheet 174 are inserted into the rear vessel 124.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by the modes of the aforementioned embodiments is achieved by the present invention if the effect is obvious from the description in the specification or readily conceived by persons ordinarily skilled in the art.

What is claimed is:

1. A light source device comprising:
   a rear vessel including a bottom plate and a first lower side plate connected to the bottom plate;
   a light source substrate accommodated in the rear vessel;
   a plurality of light-emitting diodes over the light source substrate;
   a front cover including an upper plate and a first upper side plate connected to the upper plate, located over the rear vessel, and accommodating the rear vessel at least partially inside the front cover, the first lower side plate being at least partially inside the first upper side plate;
   a light diffuser accommodated in the front cover, located over the plurality of light-emitting diodes, and spaced away from the plurality of light-emitting diodes; and
   an adhesive tape fixing the light diffuser to the front cover,
   wherein the first lower side plate and the first upper side plate each have a notch, and
   the adhesive tape is sandwiched by the rear vessel and the front cover and passes from an underside of the light diffuser to an outer side of the first upper side plate through the notch of the first upper side plate and the notch of the first lower side plate.

2. The light source substrate according to claim 1, wherein the notch of the first upper side plate and the notch of the first lower side plate overlap each other in a direction parallel to an upper surface of the bottom plate.

3. The light source device according to claim 1, further comprising a light-shielding film covering the adhesive tape, wherein the light-shielding film covers a gap on a side surface of the light source device between the first upper side plate and the first lower side plate.

4. The light source device according to claim 1,
wherein the adhesive tape is in contact with the light diffuser.

5. The light source device according to claim 1, further comprising a second adhesive tape fixing the light diffuser to the front cover,
wherein the rear vessel further includes a second lower side plate opposing the first lower side plate and connected to the bottom plate,
the front cover further includes a second upper side plate opposing the first upper side plate and connected to the upper plate,
the second lower side plate and the second upper side plate each have a notch, and
the second adhesive tape is sandwiched by the rear vessel and the front cover and passes through the notch of the second upper side plate and the notch of the second lower side plate.

6. The light source device according to claim 1,
wherein the rear vessel further includes a cushioning material over the first lower side plate.

7. The light source device according to claim 6,
wherein the cushioning material is in contact with the light diffuser or the upper plate.

8. The light source device according to claim 1, further comprising a spacer accommodated in the rear vessel,
wherein the rear vessel further includes a second lower side plate opposing the first lower side plate and connected to the bottom plate, and
the plurality of light-emitting diodes is sandwiched by the first lower side plate and the spacer.

9. The light source device according to claim 8,
wherein the spacer is located over the light source substrate.

10. The light source device according to claim 8,
wherein a difference between heights of the spacer and the light source substrate is equal to or more than 1 mm and equal to or less than 3 mm.

11. The light source device according to claim 8,
wherein the rear vessel has a third lower side plate longer than the second lower side plate in a direction perpendicular to a direction in which the second lower side plate extends.

* * * * *